US012118616B2

(12) United States Patent
Kim et al.

(10) Patent No.: US 12,118,616 B2
(45) Date of Patent: *Oct. 15, 2024

(54) METHOD AND SYSTEM FOR CONTROLLING HARDWARE PERFORMANCE FOR HIGH FREQUENCY TRADING

(71) Applicant: REBELLIONS INC., Seongnam-si (KR)

(72) Inventors: Hyunsung Kim, Seongnam-si (KR); Sungyeob Yoo, Seongnam-si (KR); Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,703

(22) Filed: Oct. 25, 2023

(65) Prior Publication Data

US 2024/0054562 A1 Feb. 15, 2024

Related U.S. Application Data

(63) Continuation of application No. 18/184,534, filed on Mar. 15, 2023, now Pat. No. 11,836,800.

(30) Foreign Application Priority Data

Apr. 7, 2022 (KR) .................. 10-2022-0043474
Jan. 2, 2023 (KR) .................. 10-2023-0000451

(51) Int. Cl.
*G06Q 40/04* (2012.01)

(52) U.S. Cl.
CPC .................. *G06Q 40/04* (2013.01)

(58) Field of Classification Search
CPC ....................................... G06Q 40/04
(Continued)

(56) References Cited

U.S. PATENT DOCUMENTS 10,897,514 B2 * 1/2021 Zhao .................. H04L 67/56
2014/0258751 A1 9/2014 Yang
(Continued)

FOREIGN PATENT DOCUMENTS

JP 2007-265245 A 10/2007
KR 10-2001-0016454 A 3/2001
(Continued)

OTHER PUBLICATIONS

Kahssay, Natnael et. al "6.111 final: HFT Accelerator," MIT. Dec. 2019 URL: https://web.mit.edu/6.111/volume2/www/f2019/projects/endrias_Project_Final_Report.pdf.

*Primary Examiner* — Robert R Niquette
(74) *Attorney, Agent, or Firm* — BROADVIEW IP LAW, PC

(57) ABSTRACT

A method for adjusting a hardware performance for high frequency trading is provided, which is performed by one or more processors, and includes receiving context information including at least one of a traffic of market data for one or more target items or a computational complexity of using a machine learning model performed based on the market data, determining whether or not to change a processing performance of the hardware based on the received context information, and changing a resource supplied to the hardware based on the determination result for changing the processing performance.

12 Claims, 13 Drawing Sheets

(58) Field of Classification Search
USPC .................................................. 705/35–45
See application file for complete search history.

(56) References Cited

U.S. PATENT DOCUMENTS

| | | | |
|---|---|---|---|
| 2018/0189674 A1* | 7/2018 | Hillard | G06N 20/00 |
| 2023/0118240 A1* | 4/2023 | Wong | G06N 3/045 |
| | | | 705/44 |
| 2023/0133989 A1 | 5/2023 | Takahashi et al. | |

FOREIGN PATENT DOCUMENTS

| | | |
|---|---|---|
| KR | 10-2060703 B1 | 2/2020 |
| WO | 2022/009542 A1 | 1/2002 |

\* cited by examiner

| consumed_power | batch size | resource |
|---|---|---|
| CP_#1 | BZ_#1 | RES_#1 |
| CP_#2 | BZ_#2 | RES_#2 |
| CP_#3 | BZ_#3 | RES_#3 |
| CP_#4 | BZ_#4 | RES_#4 |
| ⋮ | | |

910

| inference time | batch size | resource |
|---|---|---|
| INT_#1 | BZ_#1 | RES_#1 |
| INT_#2 | BZ_#2 | RES_#2 |
| INT_#3 | BZ_#3 | RES_#3 |
| INT_#4 | BZ_#4 | RES_#4 |
| ⋮ | | |

METHOD AND SYSTEM FOR CONTROLLING HARDWARE PERFORMANCE FOR HIGH FREQUENCY TRADING

CROSS-REFERENCE TO RELATED APPLICATIONS

This application is a continuation of U.S. application Ser. No. 18/184,534, filed on Mar. 15, 2023, which claims priority under 35 U.S.C § 119 to Korean Patent Application No. 10-2022-0043474, filed in the Korean Intellectual Property Office on Apr. 7, 2022, and No. 10-2023-0000451, filed in the Korean Intellectual Property Office on Jan. 2, 2023, the entire contents of which are hereby incorporated by reference.

TECHNICAL FIELD

The present disclosure relates to a method and system for adjusting a hardware performance for high frequency trading, and specifically, to a method and system for adjusting the hardware performance based on at least one of data traffic, computational complexity of machine learning, or available resources of the hardware.

BACKGROUND

Securities such as stocks, bonds, and derivatives are actively traded online. Since the price of securities frequently fluctuates, traders monitor the price volatility to buy or sell securities reaching a target price or stop-loss price. Such trading of securities can also be automatically performed through algorithms.

In addition, the high frequency trading of carrying out trades at high frequency within a short period of time by predicting minute price change is occurring in the securities market. The high frequency trading is a method of trading securities such as stocks, bonds, derivatives, and the like with high frequency within a short period of time (e.g., hundreds to thousands of times per second) using minute changes in price. For the high frequency trading, fast processing speed is very important. In general, the shorter the time it takes to process the trading algorithms based on the input information and output results, the more advantages one can have in trading.

Meanwhile, machine learning models are used for the high frequency trading. Since the high frequency trading technique using a machine learning model analyzes a large amount of data acquired from the market, when predicting the market price of a specific item, it is possible to take more factors into consideration and also achieve the excellent accuracy of market price prediction. However, analyzing a large amount of data using the machine learning model may require a lot of storage space and processing resources for computation of the machine learning model.

In addition, since the machine learning model requires complex computations on a large amount of data, the computational speed for placing orders for securities may vary depending on the amount of data using the machine learning model, the computational complexity, and the like. For example, if the amount of data is small, the computational speed of the machine learning model may increase, and if the computational complexity is high, the computational speed of the machine learning model may decrease. That is, throughput and/or latency of a system including the machine learning model may vary depending on the amount of data and/or computational complexity. If the latency for order data increases due to an increase in the amount of data or increase in the computational complexity, generation of order data may be delayed in the high frequency trading.

SUMMARY

In order to solve one or more problems (e.g., the problems described above and/or other problems not explicitly described herein), the present disclosure provides a method, a computer program stored in a recording medium, and an apparatus (system) for adjusting a hardware performance for high frequency trading.

The present disclosure may be implemented in various ways, including a method, an apparatus (system), or a computer program stored in a computer-readable storage medium, and a computer-readable storage medium in which the computer program is stored.

A method for adjusting a hardware performance for high frequency trading is provided, which may be performed by one or more processors and include receiving context information including at least one of a traffic of market data for one or more target items or a computational complexity of using a machine learning model performed based on the market data, determining whether or not to change a processing performance of the hardware based on the received context information, and changing a resource supplied to the hardware based on the determination result for changing the processing performance.

In addition, the changing the resource may include changing at least one of a speed of a clock or a voltage supplied to hardware.

In addition, the determining whether or not to change the processing performance may include determining a processing performance required for the hardware based on the received context, and the changing the resource may include adjusting at least one of the speed of the clock or the voltage supplied to the hardware according to the determined processing performance of the hardware.

In addition, the hardware may include a plurality of dedicated accelerators for computation of the machine learning model, and the adjusting at least one of the speed of the clock or the voltage may include identifying one or more dedicated accelerators from among the plurality of dedicated accelerators based on the determined processing performance, and adjusting at least one of the speed of the clock or the voltage supplied to the identified one or more dedicated accelerators.

In addition, the hardware may include at least one of a dedicated accelerator, a memory, or a processor, at least one of the dedicated accelerator, the memory, or the processor may be divided into a plurality of processing regions associated with a plurality of layers included in the machine learning model, and the adjusting at least one of the speed of the clock or the voltage may include identifying one or more processing regions from among a plurality of processing regions based on the determined processing performance, and adjusting at least one of the speed of the clock or the voltage supplied to the identified one or more processing regions.

In addition, the adjusting at least one of the speed of the clock or the voltage may include controlling so that one or more clock sources of a plurality of clock sources are activated to supply a speed of a target clock corresponding to the determined processing performance to the hardware.

In addition, the adjusting at least one of the speed of the clock or the voltage may include controlling so that one or more voltage sources of a plurality of voltage sources are activated to supply a target voltage corresponding to the determined processing performance to the hardware.

In addition, the determining whether or not to change the processing performance may include determining a performance rating of the hardware required to process the market data based on the context information, and if the determined performance rating is different from a previously determined performance rating, determining that a change in the processing performance of the hardware is required.

In addition, the method for controlling the hardware performance may include, after the changing the resource, determining whether or not the changed resource is equal to or greater than a predetermined threshold, if the changed resource is equal to or greater than a predetermined threshold, measuring a time at which the changed resource is supplied, and if the measured time reaches the threshold time, controlling so that resources lower than the threshold are supplied to the hardware.

The receiving the context information may include receiving a traffic identified based on at least one of a frequency of market data reception per unit of time or a volume of market data received per unit of time.

In addition, the hardware may include a processor for data pre-processing, the processor for data pre-processing may include a data pre-processing unit, and the determining whether or not to change the processing performance may include, if the received traffic is equal to or greater than a predetermined threshold value, determining that a change in the processing performance of the data pre-processing unit is required.

In addition, the receiving of the context information may include receiving a computational complexity measured based on at least one of load on hardware or size of parameters used for computation of the machine learning model.

In addition, the hardware may include an accelerator for computation of the machine learning model, the accelerator may include a computation module, and the determining whether or not to change the processing performance may include, if the received computational complexity is greater than or equal to the predetermined threshold value, determining that a change in the processing performance of the computation module is required.

A method for adjusting a hardware performance for high frequency trading is provided, which may be performed by at least one processor and include acquiring a plurality of input data items for high frequency trading, determining a workload for an inference computation of a machine learning model based on time allowed until the task is completed and available resources of the hardware, selecting at least one input data item from among the plurality of input data based on the determined workload, and applying the selected at least one input data item to the machine learning model.

There is provided a computer-readable non-transitory recording medium recording instructions for executing, on a computer, the method for controlling the hardware performance of the present disclosure described above.

An information processing system is provided, which may include a memory storing one or more instructions, and a processor configured to execute the one or more instructions of the memory to receive context information including at least one of traffic of market data for one or more target items or computational complexity of using a machine learning model performed based on the market data, determine whether or not to change a processing performance for hardware based on the received context information, and change the resources supplied to the hardware based on the determination result for changing the processing performance.

An information processing system is provided, which may include a memory storing one or more instructions, and a processor configured to execute the one or more instructions of the memory to acquire a plurality of input data items for high frequency trading, determine a workload for an inference computation of a machine learning model based on time allowed until the task is completed and available resources of the hardware, select at least one input data item from among the plurality of input data based on the determined workload, and apply the selected at least one input data item to the machine learning model.

According to some examples of the present disclosure, a large amount of resources can be supplied to hardware when high performance is required. Accordingly, the throughput of the hardware is improved such that the computation for generating the order data can be quickly performed without delay.

According to some examples of the present disclosure, if a change in the processing performance of the hardware is necessary, it is possible to accurately predict the resource to change and the time to change, based on the context information including at least one of traffic of market data or computational complexity of the machine learning model.

According to some examples of the present disclosure, by allocating more resources to a dedicated accelerator with a heavy load among a plurality of dedicated accelerators, a phenomenon in which the generation of order data is delayed due to a dedicated accelerator with a concentrated load can be prevented.

According to some examples of the present disclosure, by preventing the hardware from operating beyond a predetermined period of time with performance equal to or greater than a specific value, a failure phenomenon of the hardware occurring when the hardware continues to operate while exceeding its capability value can be minimized or eliminated.

According to some examples of the present disclosure, an optimal workload for the inference computation of the machine learning model can be determined, and at least one input data item having a batch size based on the determined workload can be applied to the machine learning model. Accordingly, the maximum number or maximum amount of order data for high frequency trading within the allowed time period can be generated.

According to some examples of the present disclosure, if there are remaining available resources after the resource supply to one or more dedicated accelerators, the remaining available resources can be supplied to the dedicated accelerator that can exhibit maximum performance. Accordingly, the remaining available resources are not wasted, while the performance of the system performing high frequency trading can be exhibited more effectively.

According to some examples of the present disclosure, prior to performing task scheduling, a minimum resource within an allowable range can be supplied to the dedicated accelerator. Accordingly, the available resources of the hardware are maximally gathered before task scheduling, and task scheduling for high frequency orders can be performed more efficiently using the maximally accumulated available resources.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 9 is a diagram illustrating various reference tables used for hardware resource control;

DETAILED DESCRIPTION

Figure 1:
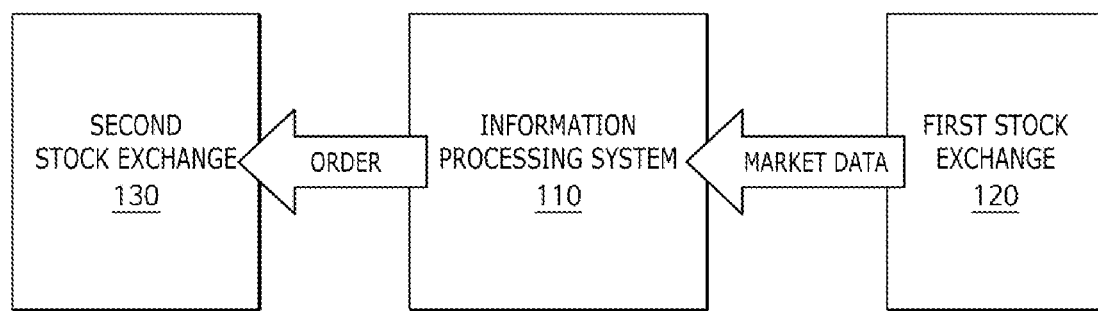
FIG. 1 is a schematic diagram illustrating an example of an operation of an information processing system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units," or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. For example, the application specific semiconductor may include a neural network processing unit (NPU) and the like. The "processor" may refer to a combination for processing devices, e.g., a combination of a CPU, NPU and FPGA, a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other. In still another example, the system may be a client device for placing a high frequency security trading order.

In addition, terms such as first, second, A, B, (a), (b), and the like used in the following examples are only used to distinguish certain components from other components, and the nature, sequence, order, and the like of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

In the present disclosure, "hardware" refers to any device that is used to implement a high frequency trading method, and may include a central processing unit (e.g., CPU, and the like), a reprogrammable or redesignable processor (e.g., FPGA), an accelerator (e.g., NPU, GPU, and the like), memory, and the like, for example, but is not limited thereto. The hardware may be included in or accessed by the information processing system.

In the present disclosure, "resource" may refer to any resource that is supplied to hardware to operate the hardware, and may include voltage, clock frequency, and the like, for example.

In the present disclosure, "items" may refer to securities such as stocks, bonds, and derivatives (options, futures, and the like) traded on the securities market, which are classified according to contents and formats. In addition to the individual items, the items may also include index-related items, industrial sector-related items, items for specific commodities (e.g., crude oil, agricultural products, gold, and the like), exchange rate-related items, and the like.

In the present disclosure, "stock exchange" refers to a venue where securities circulating in at least one country are traded, and where the securities issued by companies or government are listed and traded through brokers. The stock exchange may include a system of the stock exchange.

In the present disclosure, "Order Book (OB)" may include a list in which information on buy or sell orders (ask price, quantity, information on buyers or sellers, and the like) of buyers and sellers existing in the securities market is recorded.

In the present disclosure, "Top of the Book (ToB)" may include information on the highest and lowest bid prices.

In the present disclosure, "market data" may include data on items to be traded on the stock exchange. For example, the market data may include order books, announcements, news, and the like of (at least some of) items to be traded on the stock exchange.

In the present disclosure, "machine learning model" may include any model that is used for inferring an answer to a given input. The machine learning model may include an artificial neural network model including an input layer, a plurality of hidden layers, and an output layer. Each layer may include a plurality of nodes. In addition, in the present disclosure, the machine learning model may refer to an artificial neural network model, and the artificial neural network model may refer to the machine learning model.

In the present disclosure, "instructions" may refer to a series of computer readable instructions grouped based on functions, and to a component of a computer program being executed by a processor.

In the present disclosure, "context information" may refer to any information related to data amount used to generate order data, frequency of data generation, hardware load, system environment, and the like. For example, the context information may include at least one of traffic of market data or computational complexity of using a machine learning model performed based on the market data.

In the present disclosure, "data item" may refer to data, and the data may refer to the data item.

Hereinafter, various examples of the present disclosure will be described in detail with reference to the accompanying drawings.

FIG. 1 is a schematic diagram illustrating an operation example of an information processing system 110. The information processing system 110 may predict market conditions at one or more future time points (at time points in near future, for example, after a predetermined time) based on the market data, generate an order for a target item based on the predicted result, and transmit the generated order to a target stock exchange (to a second stock exchange). For the high frequency trading, it is very important to generate and transmit orders at a high speed based on the market data. For this reason, in high frequency trading, even the microsecond latency must be considered, and the information processing system 110 may be colocated close to the server of the target stock exchange (second stock exchange) so as to reduce the latency.

The information processing system 110 may receive market data from a first stock exchange 120. Additionally or alternatively, the information processing system 110 may receive the market data from a web site or application instead of the first stock exchange 120. In this example, the website or application may be a website or application that collects market data generated from one or more exchanges, or a website or application independently operated by a private company. The market data may include order books, announcements, news, and the like for a plurality of items. The market data may include data on a target item. For example, the market data may include the top of an order book for the target item, a list of (valid) orders for the target item, a response of the first exchange 120 to a previous order for the target item, and the like.

The market data may be dynamically received during a predetermined interval. That is, depending on the stock market environments, the size or number of market data received by the information processing system 110 during a unit of time may vary. For example, if the stock market fluctuates greatly, the size of the market data received during the unit of time or the number of data may increase. That is, if the fluctuation of the stock market increases, the size or number of changes in the order book also increases, and accordingly, the size or number of market data received from the information processing system 110 per unit of time may increase.

Although the first stock exchange 120 is illustrated as being one stock exchange in FIG. 1, this is only for convenience of description, and the first stock exchange 120 may include one or more stock exchanges. In addition, although the first stock exchange 120 is illustrated as being a separate exchange from the second stock exchange 130 in FIG. 1, this is also only for convenience of description, and the first stock exchange 120 may include the second stock exchange 130 or the second stock exchange 130 may include the first stock exchange 120.

The information processing system 110 may analyze the market data and generate an order. For example, the information processing system 110 may analyze the data generated based on the market data and/or the market data so as to predict a market situation (e.g., the price of the target item) at one or more future time points (e.g., after n seconds, where n is a positive real number), and generate an order based on the predicted result. In this case, the process of analyzing the data generated based on the market data and/or the market data may be performed by a machine learning model (e.g., DNN, and the like).

Meanwhile, in high frequency trading, it is very important to analyze the market data quickly and generate orders. However, since the general processor does not have the storage space and computing resources to support the complex and massive computations of the machine learning models, if the machine learning model is driven using the general processor, processing speed and/or efficiency may decrease. Taking this into consideration, the information processing system 110 may include a dedicated accelerator (e.g., a neural processing unit (NPU)) for the machine learning model, in which the dedicated accelerator may be implemented as an integrated circuit (e.g., Application-Specific Integrated Circuit (ASIC)) for the neural processing unit.

Meanwhile, to use the machine learning model, appropriate pre-/post-processing may be required. For example, a process of generating input data of the machine learning model from the market data or generating order data based on data output from the machine learning model may be required. The pre-/post-processing may be continuously changed according to changes in market conditions, regulations, compensation rules for market makers, and the like If the processor for pre-/post-processing is implemented as an application-specific semiconductor (e.g., ASIC) customized for a specific purpose, and if the pre-/post-processing is changed, it may be necessary to produce another processor for the changed pre-/post-processing, because redesigning is impossible. Accordingly, processes other than driving the machine learning model may be performed by a processor capable of reprogramming and/or changing designs (e.g., a processor implemented as a field programmable gate array (FPGA)).

As described above, the processor for running the machine learning model may be configured with a dedicated accelerator (e.g., a dedicated accelerator implemented as an ASIC) to process the computations of the machine learning model quickly and efficiently. In addition, the pre-/post-processing can be flexibly changed in accordance with the continuously changing market conditions using a processor capable of reprogramming or re-designing (e.g., FPGA). In this way, using two or more different processors suitable for processing high frequency trading, implementation of a flexible pre-/post-processing as well as efficient and rapid computation processing of machine learning models can be achieved.

Figure 2:
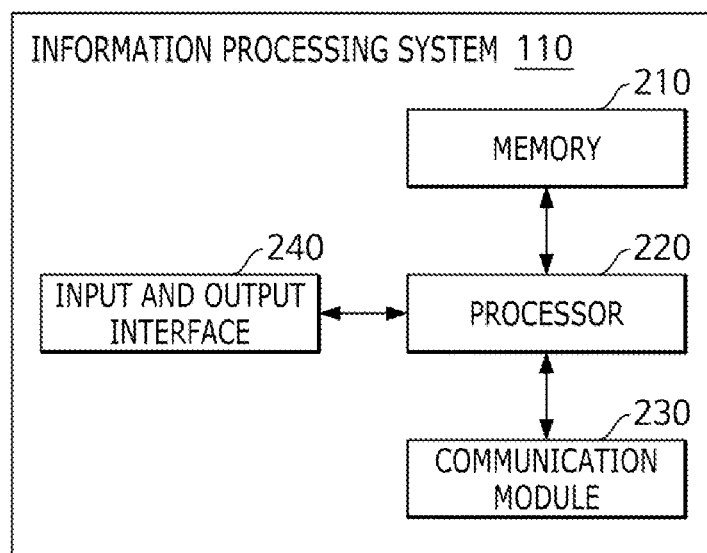
FIG. 2 is a block diagram illustrating an internal configuration of an information processing system.

FIG. 2 is a block diagram illustrating an internal configuration of the information processing system 110. The information processing system 110 may include a memory 210, a processor 220, a communication module 230, and an input and output interface 240. As illustrated in FIG. 2, the information processing system 110 may be configured to communicate information and/or data through a network by using the communication module 230.

The memory 210 may include any non-transitory computer-readable recording medium. The memory 210 may include a permanent mass storage device such as read only memory (ROM), disk drive, solid state drive (SSD), flash memory, and so on. In another example, a non-destructive mass storage device such as ROM, SSD, flash memory, disk drive, and so on may be included in the information processing system 110 as a separate permanent storage device that is distinct from the memory. In addition, an operating system and at least one program code (e.g., code to process computations of a machine learning model installed and driven in the information processing system 110, pre-/post-processing, market order transmission, and so on) may be stored in the memory 210. In FIG. 2, the memory 210 is illustrated as a single memory, but this is only for convenience of description, and the processor 210 may include a plurality of memories. For example, if the processor 220 includes a plurality of processors, the memory 210 may include one or more memories connected to and processed by each of the plurality of processors. As another example, if the processor 220 includes a plurality of processors, it 220 may include a plurality of memories connected to and processed by the plurality of processors.

These software components may be loaded from a computer-readable recording medium separate from the memory 210. Such a separate computer-readable recording medium may include a recording medium directly connectable to the information processing system 110, and may include a computer-readable recording medium such as a floppy drive, a disk, a tape, a DVD/CD-ROM drive, a memory card, and the like, for example. In another example, the software components may be loaded into the memory 210 through the communication module 230 rather than the computer-readable recording medium. For example, at least one program may be loaded into the memory 210 based on a computer program (e.g., a program or the like for analyzing market data, predicting future markets, generating and transmitting orders for securities, and the like) installed by the files provided by the developers, or by a file distribution system that distributes an installation file of an application through the communication module 230.

The processor 220 may be configured to process the commands of the computer program by performing basic arithmetic, logic, and input and output computations. The commands may be provided to a user terminal (not illustrated) or another external system by the memory 210 or the communication module 230. For example, the processor 220 may receive context information including at least one of traffic of market data for one or more target items or computational complexity of using a machine learning model performed based on the market data, and determine whether or not to change a processing performance for hardware based on the received context information. Furthermore, the resources supplied to the hardware may be changed based on the determination result as to whether or not to change the processing performance. In addition, the processor 220 may determine a workload for the inference computation of the machine learning model based on time allowed until a task is completed and available resources of the hardware, and extract at least one input data item from a plurality of input data items based on the determined workload. In this case, the available resources of the hardware may be, among all resources, resources that can be used to process the workload. For example, the available resources may be, among all resources, resources remaining after supply to the hardware. In addition, the processor 220 may apply the extracted at least one input data item to the machine learning model. Furthermore, the processor 220 may determine resources of the hardware for processing the workload based on the allowed time and the available resources of the hardware, and supply the determined resources to the hardware.

The communication module 230 may provide a configuration or function for the user terminal (not illustrated) and the information processing system 110 to communicate with each other through a network, and may provide a configuration or function for the information processing system 110 to communicate with an external system (e.g., a separate cloud system). For example, control signals, commands, data, and the like provided under the control of the processor 220 of the information processing system 110 may be transmitted to the user terminal and/or the external system through the communication module 230 and the network through the communication module of the user terminal and/or an external system. For example, the external system (e.g., stock exchange system) may receive the order data and the like from the information processing system 110.

In addition, the input and output interface 240 of the information processing system 110 may be a means for interfacing with a device (not illustrated) for inputting or outputting, which may be connected to the information processing system 110 or included in the information processing system 110. For example, the input and output interface 240 may include at least one of a PCI express interface and an Ethernet interface. In FIG. 2, the input and output interface 240 is illustrated as a component configured separately from the processor 220, but aspects are not limited thereto, and the input and output interface 240 may be configured to be included in the processor 220. The information processing system 110 may include more components than those illustrated in FIG. 2.

The processor 220 of the information processing system 110 may be configured to manage, process, and/or store the information and/or data received from a plurality of user terminals and/or a plurality of external systems. The processor 220 may receive context information, determine whether or not to change processing performance for hardware based on the context information, and change resources to be supplied to the hardware based on the determination result. In this case, the processor 220 may include a central processing unit (CPU). In addition, the hardware may include the processor 220 and/or the memory 210 included in the information processing system 110, and for example, the processor 220 may further include at least one processor implemented as an FPGA for pre-processing and post-processing and one or more dedicated accelerators implemented as an ASIC for machine learning models and a processor for resource control. Additionally, the memory 210 may include one or more memories accessible by each of the central processing unit, FPGA, and dedicated accelerator. FIG. 2 illustrates that the memory 210, the processor 220, and the communication module 230 are separately implemented in the information processing system 110, but the aspects are not limited thereto, and in an implementation, at least a part of the memory 210 and/or at least a part of the communication module 230 may be included in the processor 220.

Figure 3:
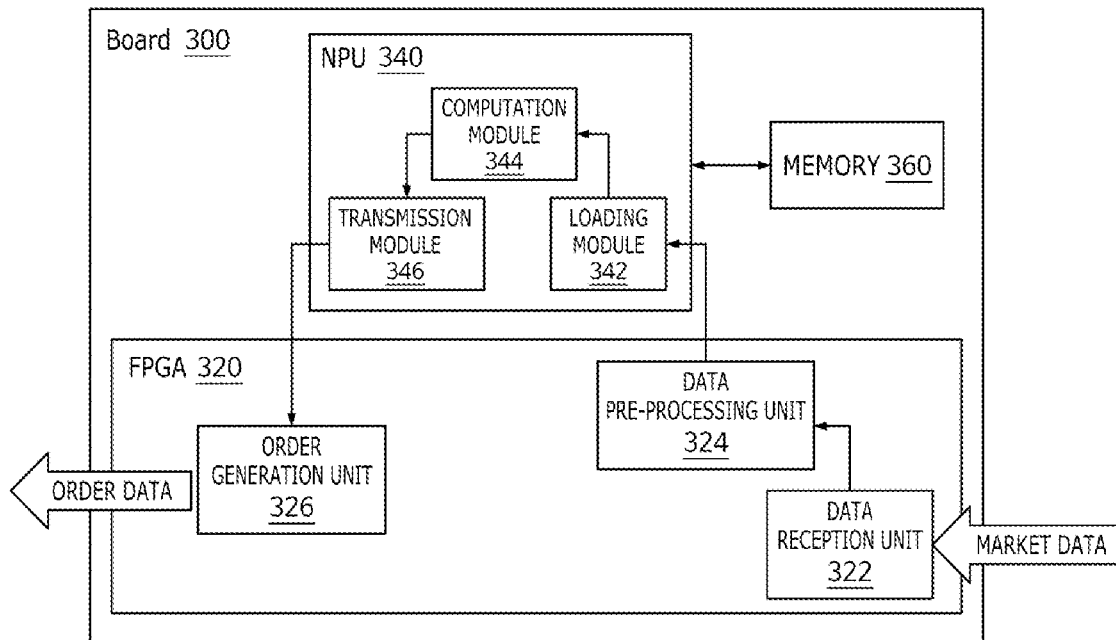
FIG. 3 is a diagram illustrating an internal configuration of a processor.

FIG. 3 is a diagram illustrating an internal configuration of a processor 300. FIG. 3 illustrates the processor 300 implemented in the form of a board. For example, the processor 220 of the information processing system 110 may include the processor 300 of FIG. 3. In addition, a central processing unit (CPU) may be further included in the processor 220 of the information processing system 110.

The processor 300 may include one or more processors 320 for pre-/post-data processing, a dedicated accelerator (e.g., a dedicated accelerator implemented as an ASIC) 340 for the machine learning model, and at least one memory 360. For convenience of explanation, in FIG. 3, one or more processors 320 for pre-/post-processing are referred to as the FPGA 320, and the dedicated accelerator 340 for the machine learning model is referred to as the NPU 340.

The FPGA 320 may include a data reception unit 322, a data pre-processing unit 324, and an order generation unit 326. In addition, the NPU 340 may include a loading module 342, a computation module 344 and a transmission module 346. Although the internal components of the processor 300 are distinguished by function in FIG. 3 for explanation purposes, it should not be understood as meaning that the components are physically separated. In addition, the internal configuration of the FPGA 320 and the NPA 340 illustrated in FIG. 3 is only an example, and it is not intended to depict essential configurations only.

The data reception unit 322 of the FPGA 320 may receive market data from one or more stock exchanges (e.g., the first stock exchange, the second stock exchange, and the like), a website, an application, or the like for one or more target items. The one or more stock exchanges may include the target stock exchange. In this example, the target stock exchange is a destination of the transmitted order data, and may perform a security sell or buy based on the order data.

The market data may include data on items traded on the one or more stock exchanges. For example, the market data may include an order book of (at least some of) the items traded on the stock exchange, and additionally, the market data may include data on a target item. For example, the market data may include the top of an order book for the target item, a list of (valid) orders for the target item, a response of the target stock exchange to a previous order for the target item, and the like.

The data reception unit 322 may receive the market data from the stock exchange or the web site. Meanwhile, the higher volatility in the stock market and/or target securities may mean the increased frequency of the market data reception or the increased size of the market data, and the lower volatility in the stock market and/or target securities may mean the decreased frequency of the market data reception or the decreased size of the market data. For example, if the price volatility of the target item is high, the data reception unit 322 may receive the market data including the order book of the target item more frequently during a unit of time. On the other hand, if the price volatility of the target item is low, the data reception unit 322 may receive the market data including the order book of the target item less frequently during the unit of time. That is, if the price volatility of the target item is high, the market data reception traffic for the target item may increase.

In the high frequency trading, since it is important to process data at a high speed, the market data may be received through a User Datagram Protocol (UDP) having a high data transmission rate. However, in some examples, other communication protocols (e.g., TCP/IP) may be used to receive the market data as needed (e.g., to ensure reliability of the data).

The data pre-processing unit 324 may generate input data for the machine learning model based on the received one or more market data. The data pre-processing unit 324 may select from the market data one or more input features of one or more items and configure the input data. That is, one or more market data may be pre-processed by the data pre-processing unit 324, and the input data may be configured based on the pre-processed market data. For example, the data pre-processing unit 324 may include a feature extraction unit configured to extract or select the input features included in the input data. A plurality of input data items generated by the data pre-processing unit 324 may be stored in a queue.

One or more items included in the input data may include items that may be a leading index of the volatility of the target item in the market. For example, if the target item intended to be ordered is the stock (spot) of Company A, the input data may include data on futures stocks related to company A's stock, option stocks related to company A's stock, stocks related to company A included in other exchanges, futures stocks for products (e.g., crude oil, and the like) related to company A, and the like. In addition, the one or more input features included in the input data may include information meaningful in predicting market conditions of the target item. For example, the input features may include various information extractable from the order book of one or more items, such as a market price (transaction price), a price and quantity at the top of the order book of a buying side, a price and quantity at the top of the order book of a selling side, the number of sellers wishing to sell, the ask price for buy of the next stage at the top of the order book, the ask price for sell of the next stage at the top of the order book, and the variance of the ask price included in the order book, and processed information thereof and/or reliability of the information. The configuration of the input data will be described below in detail with reference to FIG. 5.

The input data generated by the data pre-processing unit 324 may be transferred to the NPU 340, which is a dedicated accelerator for the machine learning model, and input to the machine learning model (e.g., DNN). The NPU 340 may be implemented as an application specific integrated circuit (ASIC) specialized for driving a machine learning model. In response to inputting the input data to the machine learning model, the NPU 340 may acquire prediction data for the target item. For example, the NPU 340 may input the input data to the machine learning model and derive output data that predicts the price (e.g., market price) of the target item at one or more future time points. The machine learning model for deriving the output data associated with the order for the target item will be described in detail below with reference to FIGS. 4 to 6. In FIG. 3, the accelerator for the machine learning model is illustrated as a dedicated accelerator (NPU), but aspects are not limited thereto, and any accelerator (e.g., GPU, and the like) for the machine learning model may be used.

The order generation unit 326 may receive the prediction data output from the machine learning model and generate the order data on the target stock exchange based on the prediction data. For example, the order generation unit 326 may generate the order data for the target item according to a predetermined policy, based on price volatility prediction and/or price prediction of the target item at a future time point inferred from the machine learning model. Specifically, if the price of the target item is predicted to increase, the order generation unit 326 may immediately generate a new buy order or correct ask price of an existing sell order. The order data may include information on the type of order (new order, order cancellation, order correction) for the target item, whether to buy or sell, price (ask price), quantity, and the like.

The memory 360 may be memory shared by a plurality of processors. For example, the memory 360 may be a memory shared by a plurality of NPUs 340. Additionally or alternatively, the memory 360 may be shared by the FPGA 320 and NPU 340. Direct memory access (DMA) may be used to share the memory 360 by a plurality of processors. In order to share the memory 360 based on DMA, a DMA controller (not illustrated) may be mounted on the board. A predetermined number of NPUs 340 may share one memory 360, and if the number of NPUs 340 increases, the memories 360 proportional in number to the increased number may be installed. The memory 360 may store (load) some or all of the input data. In addition, the memory 360 may load a plurality of parameters used for computation of the machine learning model. A plurality of parameters may be replaced or updated during the computation process of the machine learning model. Although the memory 360 outside the NPU 340 is illustrated in FIG. 3, the memory 360 and the NPU 340 may be implemented as one single chip.

The loading module 342 of the NPU 340 may load some or all of the input data received from the data pre-processing unit 324 of the FPGA 320 into the memory 360. For example, the loading module 342 may acquire data required for computation of the machine learning model from the input data and load the acquired data into the memory 360. Some or all of the input data stored in the queue may be loaded into the memory 360. The loading module 342 may extract from the queue at least one input data item corresponding to a batch size allocated to the NPU 340 and load the extracted input data into the memory 360.

The computation module 344 may input the data loaded into the memory 360 to the machine learning model to perform computation of the machine learning model to generate prediction data for the target item.

If there are a plurality of NPUs 340, each NPU 340 may be divided into a plurality of processing regions associated with a plurality of layers included in the machine learning model. In this case, the computation module 344 may perform some computations among all computations of the machine learning model. For example, if the machine learning model includes an artificial neural network model having a plurality of layers, a first computation module included in the first NPU may perform computations on the first layer, and a second computation module included in the second NPU may perform computations on the second layer. The computation module 344 may include a computation unit included in the NPU 340.

The transmission module 346 of the NPU 340 may provide the computation result (e.g., prediction data for the target item) output from the computation module 344 to the order generation unit 326 of the FPGA 320. A communication line having a predetermined input and output bandwidth may be formed between the FPGA 320 and the NPU 340, and the input data may be provided from the FPGA 320 to the NPU 340 using the communication line, and the prediction data may be provided from the NPU 340 to the FPGA 320.

The processor 300 having the structure as described above may have a latency before the order data is generated based on the market data. This latency before the order data generation may increase as the market data reception traffic increases, as the amount of computation of the machine learning model increases, or as the batch size input to the machine learning model increases. That is, the latency before the order data generation may increase as the traffic of market data increases, or as the computational complexity of the machine learning model increases. In high frequency trading, latency may act as a fatal disadvantage. Accordingly, in high frequency trading, it is important to reduce latency in order to generate order data quickly.

In the present disclosure, as will be described below, if it is predicted according to the context information that the load on hardware will increase or that hardware performance needs to be improved, it is possible to control so that loading, computation, and transmission of data is performed more quickly, by allocating more resources than usual to the hardware to temporarily increase the hardware performance. In this case, the resource may refer to any resource that can be provided to hardware, and may include at least one of voltage or clock source, for example, but not limited thereto. A method for adjusting the hardware performance will be described below in detail with reference to FIGS. 7 to 14.

Hereinafter, a method of training the machine learning model, and the output data acquired from the machine learning model will be described with reference to FIGS. 4 to 6.

Figure 4:
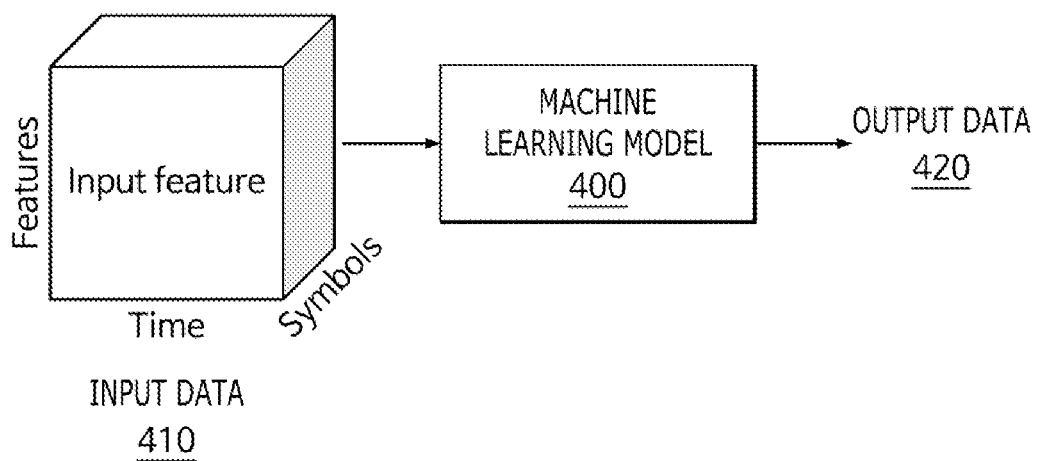
FIG. 4 is a diagram illustrating an example in which a machine learning model outputs output data based on input data.

FIG. 4 is a diagram illustrating an example in which the machine learning model outputs output data 420 based on input data 410. A machine learning model 400 may output the output data 420 associated with an order for the target item based on the input data 410. The machine learning model may output a predicted price (e.g., a market price or a median price) of the target item at a specific point in the future based on the input data 410. According to another example, the predicted prices of the target item at a plurality of future time points may be output based on the input data 410. The price of the target item at each of a plurality of future time points may be predicted based on multi-horizon predicting using the machine learning model 400.

The input data 410 input to the machine learning model 400 may include an input feature map including one or more input features for one or more items at one or more time points. The input data 410 of the machine learning model 400 will be described in detail below with reference to FIG. 5.

The machine learning model 400 may be trained to infer reference output data associated with a market order in a target stock exchange using the reference input data generated based on the reference market data from one or more stock exchanges. For example, the machine learning model 400 may be trained by supervised learning to infer the median price of the target item at the next time point based on input data in a time interval including a total of M consecutive time points, by using reference input data from time point (t) to time point (t+M−1) generated based on first reference market data of the first stock exchange and second reference market data of the second stock exchange, and median price data of the target item at time point (t+1). For example, t and M may be natural numbers.

The machine learning model 400 may be trained to infer prediction data for a specific item at a plurality of time points which are later than a specific time point, based on a training set including market data and ground truth data for the specific item at the specific time point. In this case, the ground truth data may be the price for the specific item at each of a plurality of time points in the future. The difference (loss) between the inferred price for the specific item at the specific future time point output from the machine learning model 400 and the price for the specific item at the specific future time point included in the ground truth data may be calculated, and the calculated loss may be feedbacked to the machine learning model 400, thereby adjusting the weight of each node included in the artificial neural network.

The output data 420 output by the machine learning model 400 may include information associated with a market order on the target stock exchange, and the processor (e.g., the processor of the information processing system) may generate order data for the target item based on the output data 420 and the determined policy.

In this case, according to the predicted result included in the output data 420, the predetermined policy may define stock selling, buying, trading quantity, and the like. The machine learning model 400 of the present disclosure may be an artificial neural network model. The artificial neural network model will be described below in detail with reference to FIG. 6.

Figure 5:
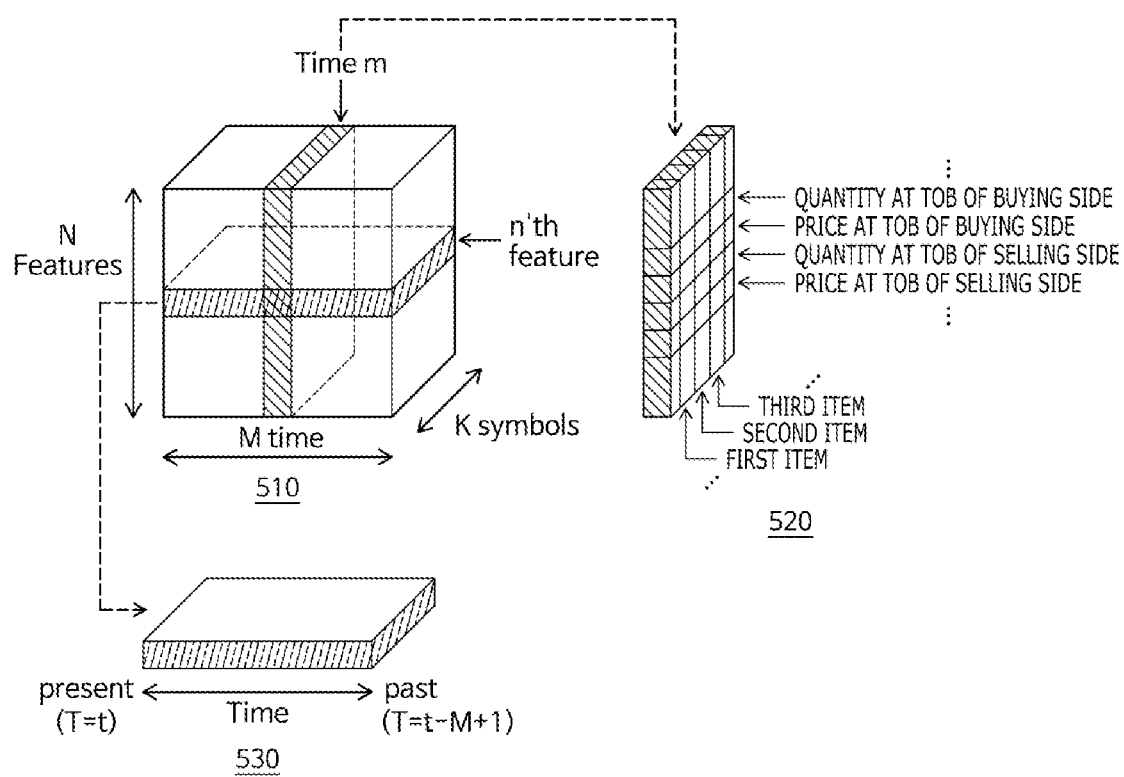
FIG. 5 is a diagram illustrating an example of a configuration of input data of a machine learning model.

FIG. 5 is a diagram illustrating an example of a configuration of input data 510 of the machine learning model. The information processing system may generate the input data 510 based on the market data received from one or more exchanges. The input data 510 may include an input feature map including one or more input features for one or more items at one or more time points.

For example, the input feature map may include N input features (where N is a natural number) for K items (where K is a natural number) at M time points (where M is a natural number), as illustrated in FIG. 5. In the illustrated example, data 520 at a specific time point (time (m) in FIG. 5) in the input feature map included in the input data may include one or more input features (the price and quantity at the top of the order book on the buying side, the price and quantity at the top of the order book on the selling side, and the like in FIG. 5) for one or more items (first item, second item, third item, and the like in FIG. 5) at a specific time point. In addition, data 530 for a specific input feature (n'th input feature in FIG. 5) in the input feature map included in the input data may include specific input features for one or more items at one or more time points (from time point (t−M+1) to time point (t) in FIG. 5). The input feature map may be generated such that one or more input features for different items intersect each other.

The one or more items included in the input data 510 may be items serving as a leading index of the market conditions of the target item to be ordered. For example, if the target item to be ordered is the company A's stock (spot), the item that serves as the leading index may be at least one of: futures stocks related to the company A's stock; option stocks related to the company A's stock; stocks related to the company A included in another exchange; and futures stocks for products related to the company A. The one or more items may include a target item. That is, the information processing system may predict the future market conditions of the target item based on the input data including the data on the target item. In addition, the information on each input item may be included as a code (symbol) associated with each input item.

The one or more input features included in the input data 510 may include information meaningful in predicting market conditions of the target item. For example, the input features may include various information extractable from the order book of one or more items, such as a market price (transaction price), a price and quantity at the top of the order book of a buying side, a price and quantity at the top of the order book of a selling side, the number of sellers wishing to sell, the ask price for buy of the next stage at the top of the order book, the ask price for sell of the next stage at the top of the order book, and the variance of the ask price included in the order book, and processed information thereof and/or reliability of the information. The one or more input features may be extracted from each of one or more items.

The input data 510 configured as described above may be transmitted to the dedicated accelerator for the machine learning model by the processor (e.g., FPGA or the like), and may be input to the machine learning model.

Figure 6:
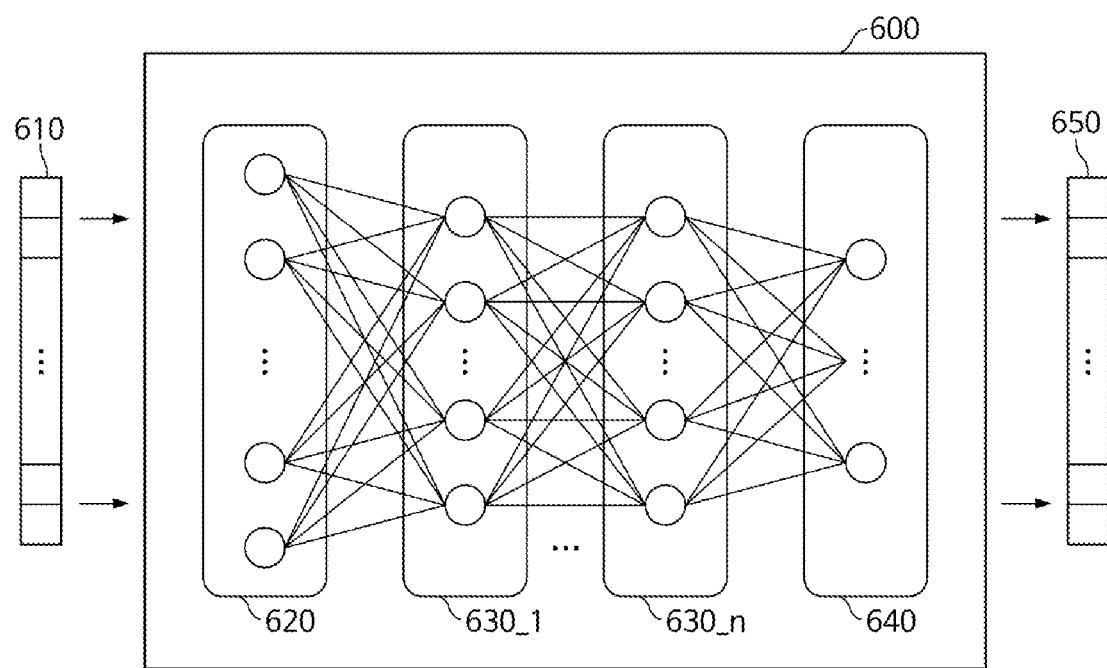
FIG. 6 illustrates an example of an artificial neural network model.

FIG. 6 illustrates an example of an artificial neural network model 600. In machine learning technology and cognitive science, the artificial neural network model 600 as an example of the machine learning model refers to a statistical learning algorithm implemented based on a structure of a biological neural network, or to a structure that executes such algorithm.

The artificial neural network model 600 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 600 may include any probability model, neural network model, and the like, that is used in artificial intelligence learning methods such as machine learning and deep learning.

The artificial neural network model 600 may include an artificial neural network model configured to infer data (e.g., data about price, price volatility, and the like) associated with a market order in a target stock exchange at a time point in the future, using the input data generated based on the market data of one or more stock exchanges. According to another example, the artificial neural network model 600 may also include a multi-horizon forecasting model to predict data (e.g., data about price, price volatility, and the like) associated with the market order on the target stock exchange at multiple future time points.

The artificial neural network model 600 may be implemented as a multi-layer perceptron (MLP) formed of multi-layer nodes and connections between them. The artificial neural network model 600 may be implemented using one of various artificial neural network model structures including the MLP. As illustrated in FIG. 6, the artificial neural network model 600 may include an input layer 620 to receive an input signal or data 610 from the outside, an output layer 640 to output an output signal or data 650 corresponding to the input data, and (n) number of hidden layers 630_1 to 630_n (where n is a positive integer) positioned between the input layer 620 and the output layer 640 to receive a signal from the input layer 620, extract the features, and transmit the features to the output layer 640. In an example, the output layer 640 receives signals from the hidden layers 630_1 to 630_n and outputs them to the outside.

The method of training the artificial neural network model 600 includes the supervised learning that trains to optimize for solving a problem with inputs of teacher signals (correct answers), and the unsupervised learning that does not require a teacher signal. The artificial neural network model 600 may be trained by the supervised and/or unsupervised learning to infer the data associated with the market order in the target stock exchange. For example, the artificial neural network model 600 may be trained by the supervised learning to infer the reference price of the target item at one or more future time points from the reference input data.

The artificial neural network model 600 trained as described above may be stored in a memory (not illustrated) of the information processing system, and may infer the data associated with the market order in a target stock exchange in response to inputting the data received from the communication module and/or memory.

The input data of the artificial neural network model for inferring the data associated with the market order in the target stock exchange may include one or more input features for one or more items at one or more time points. For example, the input data input to the input layer 620 of the artificial neural network model 600 may be a vector in which data including information on one or more input features for one or more items at one or more time points is configured as one vector data element. In response to the input of data, output data output from the output layer 640 of the artificial neural network model 600 may be a vector representing or characterizing the data associated with the market order in the target stock exchange. That is, the output layer 640 of the artificial neural network model 600 may be configured to output a vector representing or characterizing the data associated with the market order in the target stock exchange at one or more future time points. In the present disclosure, the output data of the artificial neural network model 600 is not limited to the types described above, and may include any information/data representing the data associated with the market order in the target stock exchange at one or more future time points.

As described above, the input layer 620 and the output layer 640 of the artificial neural network model 600 are respectively matched with a plurality of output data items corresponding to a plurality of input data items, and the synaptic values between nodes included in the input layer 620, and the hidden layers 630_1 to 630_n, and the output layer 640 are adjusted, so that training can be processed to extract a correct output corresponding to a specific input. Through this training process, the features hidden in the input data of the artificial neural network model 600 may be confirmed, and the synaptic values (or weights) between the nodes of the artificial neural network model 600 may be adjusted so as to reduce the errors between the output data calculated based on the input data and the target output. The artificial neural network model 600 trained as described above may output the data associated with the market order in the target stock exchange in response to the input data.

The internal configuration of the information processing system in which hardware performance is dynamically adjusted will be described with reference to FIGS. 7 and 8. For convenience of description, the processor performing data pre-processing and post-processing is referred to as the FPGA with reference to FIGS. 7 and 8. In addition, the dedicated accelerator for the machine learning model will be referred to as the NPU below.

Figure 7:
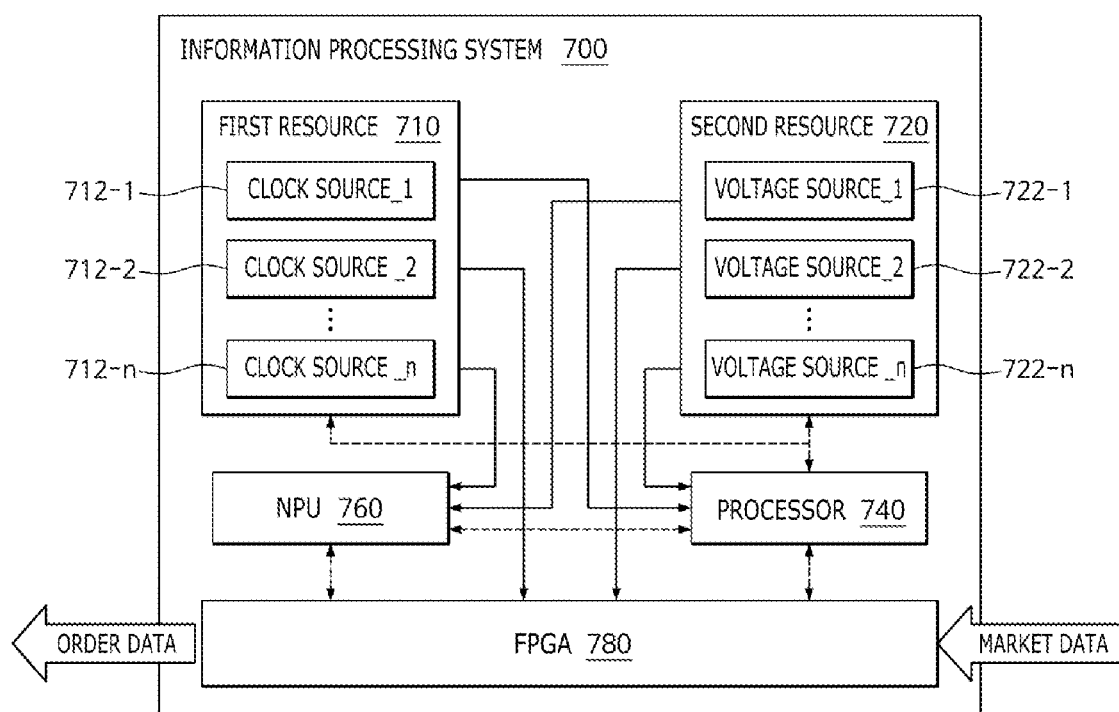
FIG. 7 is a diagram illustrating an internal configuration of an information processing system.

FIG. 7 is a diagram illustrating an internal configuration of an information processing system 700. As illustrated in FIG. 7, the information processing system 700 may include a plurality of resources 710 and 720, a processor 740, an NPU 760, and an FPGA 780. For example, the processor 740 may be a central processing unit. In addition, although not illustrated, the information processing system 700 may further include a memory. In FIG. 7, a solid line may indicate a line through which resources are supplied, and a dotted line may indicate a communication path. The information processing system 700 may be included in at least a part of the information processing system 110 of FIG. 2. The processor 740, the NPU 760, and/or the FPGA 780 may include a phase-locked loop (PLL), and may be operated by appropriately converting input signals supplied from the first resource 710.

The processor 740 may receive context information including at least one of traffic of market data for one or more target items or computational complexity of using a machine learning model performed based on the market data. The processor 740 may determine whether or not to change the processing performance of the hardware based on the received context information, and change the resources supplied to the hardware based on the determination result for changing the processing performance. In this case, the hardware may include the FPGA 780, the NPU 760, the processor 740, a memory (not illustrated), an input traffic monitoring module (not illustrated), and the like. The input traffic monitoring module may be included in the information processing system 700 and measure or monitor traffic such as the size or frequency of data input to the FPGA 780. Alternatively, the input traffic monitoring module may be implemented to be included in the FPGA 780. The traffic of market data measured or monitored by the input traffic monitoring module may be included in the context information and provided to the processor 740.

The first resource 710 may include a plurality of clock sources 712-1 to 712-n, where n is a natural number. The respective frequencies of the plurality of clock sources 712-1 to 712-n may be the same as or different from each other. Alternatively, frequencies of at least some of the plurality of clock sources 712-1 to 712-n may be the same as each other. For example, the first clock source 712-1 may be 200 MHz, and the second clock source 712-2 may have 1 GHz. As another example, both the first clock source 712-1 and the second clock source 712-2 may have 2 GHz.

The plurality of clock sources 712-1 to 712-n having different frequencies (speeds) according to preset performance rating may be included in the first resource 710. For example, a clock source of a first frequency corresponding to a first performance rating, a clock source of a second frequency corresponding to a second performance rating, and a clock source of a third frequency corresponding to a third performance rating may be included in the first resource 710. In this example, the first performance rating may be a rating related to the fastest computation, the third performance rating may be a rating related to the slowest computation, and the second performance rating may be a rating related to about intermediate computation. In addition, the first frequency may be a frequency of the fastest speed, the third frequency may be a frequency of the slowest speed, and the second frequency may be a frequency related to an intermediate speed.

At least one of the plurality of clock sources 712-1 to 712-n may be activated to supply clock signals of a target speed to the hardware of the information processing system 700. In this case, the hardware may include the FPGA 780, the NPU 760, the processor 740, a memory (not illustrated), and the like. As illustrated in FIG. 7, a plurality of clock signal supply lines are formed between the first resource 710 and the hardware, and the clock signal of the target speed may be supplied to the hardware through each clock signal supply line. Which of the plurality of clock sources 712-1 to 712-n is to be activated may be determined by the processor 740.

The second resource 720 may include a plurality of voltage sources 722-1 to 722-n, where n is a natural number. Voltages of the plurality of voltage sources 722-1 to 722-n may be different from each other. Alternatively, frequencies of at least some of the plurality of voltage sources may be the same as each other. For example, the first voltage source 722-1 may have 0.7 V, and the second voltage source 722-2 may have 1 V. As another example, both the first voltage source 722-1 and the second voltage source 722-2 may have 5 V.

In addition, the voltage sources 722-1 to 722-n having different voltages according to predetermined performance rating may be included in the second resource 720. For example, a first voltage source corresponding to a first performance rating, a second voltage source corresponding to a second performance rating, and a third voltage source corresponding to a third performance rating may be included in the second resource 720. In this example, the first performance rating may be a rating related to the fastest computation, the third performance rating may be a rating related to the slowest computation, and the second performance rating may be a rating related to about intermediate computation. In addition, the first voltage source may be a voltage source supplying the strongest voltage, the third voltage source may be a voltage source supplying the weakest voltage, and the second voltage source may be a voltage source related to about moderate intensity of voltage.

At least one voltage source may be activated to supply a target voltage of a target intensity to the hardware of the information processing system 700. As illustrated in FIG. 7, a plurality of voltage supply lines may be formed between the second resource 720 and the hardware, and the target voltage may be supplied to the hardware through each voltage supply line. The intensity of the voltage to be supplied to hardware may be determined by the processor 740.

The FPGA 780 may pre-process the market data to generate input data of the machine learning model, and provide the generated input data to the NPU 760. In addition, the FPGA 780 may generate order data for buying or selling securities of a target item based on the prediction data of the machine learning model received from the NPU 760 and transmit the generated order data to the target stock exchange.

The NPU 760 may perform the computation of the machine learning model based on the input data received from the FPGA 780. The NPU 760 may transfer the output data of the machine learning model to the FPGA 780.

The FPGA 780 and the NPU 760 may be supplied with the clock signals from the first resource 710 and the voltage from the second resource 720. The FPGA 780 and the NPU 760 may be supplied with the voltages of intensities different from or same as each other and/or the clock signals of the same speed as each other. As a faster clock signal is supplied, the FPGA 780 and the NPU 760 may have faster computational speeds. In addition, as a voltage of higher intensity is supplied, the FPGA 780 and the NPU 760 may have faster computational speeds. In addition, although not illustrated, the memory may be supplied with the clock signals from the first resource 710 and the voltages from the second resource 720.

The processor 740 may control supply of resources to dynamically adjust the hardware performance. The processor 740 may determine whether or not to change the processing performance of the hardware based on the context information, and change the resources to be supplied to the hardware based on the determined result. In this case, the context information may include at least one of traffic of market data for one or more target items or computational complexity of the machine learning model performed based on the market data. The processor 740 may determine a processing rating required by the hardware based on the context information, and determine a target voltage and/or a target clock based on the determination result.

The traffic of market data may be measured based on the size of the market data received by the FPGA 780 or the frequency of market data reception per unit of time.

In addition, the computational complexity of the machine learning model may be measured based on at least one of the load on hardware or the size of parameters used for the computation of the machine learning model. In this case, the load on hardware may be measured based on at least one of the availability rate of the FPGA 780, the availability rate of the NPU 760, and the availability rate of the memory. In addition, the size of parameters may be measured based on the size of the parameters loaded into the memory (e.g., memory of the NPU) used for the computation of the machine learning model.

The processor 740 may control such that one or more of the clock sources 712-1 to 712-n included in the first resource 710 are activated, and one or more of the voltage sources 722-1 to 722-n included in the second resource 720 are activated. The one or more activated clock sources may supply clock signals of a target speed to the hardware, and the one or more activated voltage sources may supply target voltages to the hardware.

The components included in the hardware may be divided according to processing regions. For example, one or more memories may be included in a first group defined as a first processing region, one or more NPUs may be included in a second group defined as a second processing region, and one or more FPGAs may be included in a third group defined as a third processing region. As another example, the first memory and the first FPGA may be included in the first group defined as the first processing region, the second memory and the second FPGA may be included in the second group defined as the second processing region, and the first NPU may be included in the third group.

In addition, the components included in each processor may be divided according to the processing regions. For example, referring to FIG. 3, the data pre-processing unit 324 and the data reception unit 322 included in the FPGA and the loading module 342 included in the NPU may be included in the first group defined as the first processing region, the computation module 344 included in the NPU may be included in the second group defined as the second processing region, and the transmission module 346 included in the NPU and the order generation unit 326 included in the FPGA 320 may be included in the third group defined as the third processing region. Dividing the processing regions described above may be established based on physical areas or data processing flows.

If a plurality of processing regions are divided in this way, clock sources and/or voltage sources dedicated to each group may be allocated in advance. For example, the first to third clock sources and/or the first to third voltage sources may be allocated to the first group, the fourth to sixth clock sources and/or the fourth to sixth voltage sources may be assigned to the second group, and the seventh to ninth clock sources and/or the seventh to ninth voltage sources may be allocated to the third group.

If the clock sources and/or the voltage sources are pre-allocated for each group, the processor 740 may identify a group to change performance, and adjust the intensity of voltage and/or clock speed to be supplied to the hardware included in the identified group. For example, if it is determined that the traffic of market data is equal to or greater than a predetermined threshold, in order to improve the performance of pre-processing of market data, the processor 740 may identify a group that includes the data pre-processing unit of the FPGA and control the first resource 710 and/or the second resource 720 such that a larger amount of resources are supplied to the identified group. As another example, if the computational complexity of the machine learning model is equal to or greater than a predetermined threshold, in order to increase the computational speed of the machine learning model, the processor 740 may identify a group that includes the computation module of the NPU and control a first resource 710 and/or a second resource 720 to supply a larger amount of resources to the identified group. The processor may activate one or more of the plurality of voltage sources and/or the plurality of clock sources associated with the identified group, or deactivate already activated voltage sources and/or clock sources to supply the clock signals of the target speed and/or the target voltages.

Meanwhile, a plurality of NPUs may be included in the information processing system.

Figure 8:
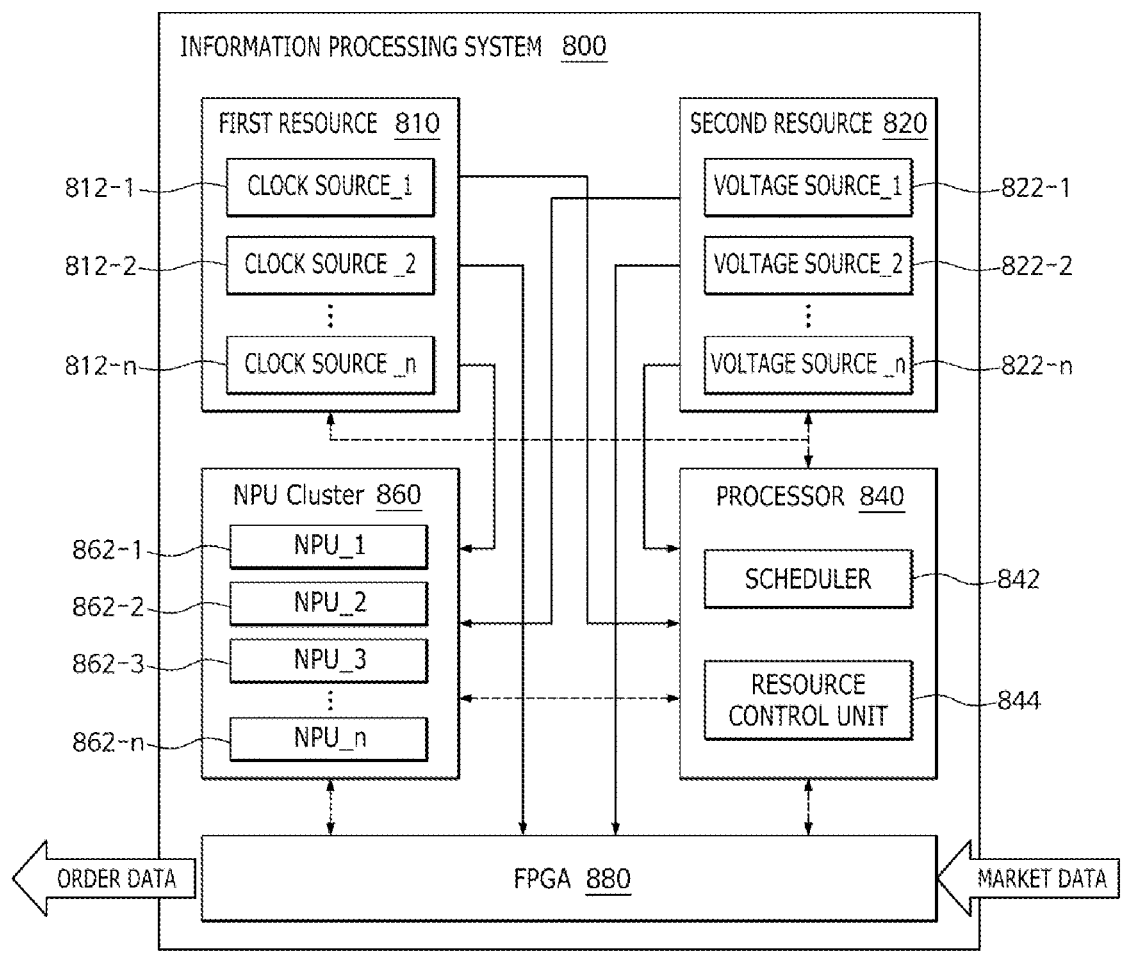
FIG. 8 is a diagram illustrating an internal configuration of an information processing system.

FIG. 8 is a diagram illustrating an internal configuration of an information processing system 800. Hereinafter, in describing certain examples with reference to FIG. 8, elements or operations overlapping with those already described above with reference to FIG. 7 will not be described or briefly summarized, and only the differences will be described in detail. The information processing system 800 may be included in at least a part of the information processing system 110 of FIG. 2.

As illustrated in FIG. 8, the information processing system 800 may include a plurality of resources 810 and 820, a processor 840, an NPU cluster 860 and an FPGA 880. Although not illustrated, the information processing system 800 may further include a memory, an input traffic monitoring module, and the like.

The FPGA 880 may pre-process market data to generate input data of the machine learning model and provide the input data to the NPU cluster 860. At this time, the generated at least one input data item may be stored in the memory, and the at least one input data item stored in the memory may be provided to the NPU cluster 860. For example, the memory may include a queue, and at least one input data item may be stored in the queue, and at least one input data item may be provided to the NPU cluster 860 based on the priority of the input data stored in the queue.

At least one input data item stored in the memory may be extracted based on the batch size determined by the processor 840, and the extracted input data may be provided to the NPU cluster 860. In addition, the FPGA 880 may generate order data for buying or selling securities of a target item based on prediction data (output data) of the machine learning model received from the NPU cluster 860 and transmit the data to the target stock exchange.

The first resource 810 may include a plurality of clock sources 812-1 to 812-n. One or more of the plurality of clock sources 812-1 to 812-n may be activated to supply clock signals of a target speed to the hardware of the information processing system 800.

The second resource 820 may include a plurality of voltage sources 822-1 to 822-n. One or more voltage sources may be activated to supply target voltages to the hardware of the information processing system 800.

The processor 840 may control supply of resources to dynamically adjust the hardware performance. The processor 840 may determine whether or not to change the processing performance of the hardware based on the context information, and adjust resources to be supplied to the hardware based on the determined result. According to another example, the processor 840 may monitor the load of each of the plurality of NPUs 862-1 to 862-n included in the NPU cluster 860, and when identifying an NPU with load exceeding a threshold, control the first resource 810 and/or the second resource 820 such that more resources are supplied to the identified NPU.

The NPU cluster 860 may include the plurality of NPUs 862-1 to 862-n. At least one of the plurality of NPUs 862-1 to 862-n may perform computation of the machine learning model based on the input data re-processed by the FPGA 880, and transfer the output data of the machine learning model to the FPGA 880. At least one of the plurality of NPUs 862-1 to 862-n may extract the input data from the queue. For example, the FPGA 880 may store at least one input data item obtained by pre-processing the market data in the queue, and at least one of the plurality of NPUs 862-1 to 862-n may extract the input data from the queue.

Each of the NPUs 862-1 to 862-n may be associated with the machine learning models operating independently of each other. For example, the NPU_1 862-1 may be associated with a first machine learning model, the NPU_2 862-2 may be associated with a second machine learning model, and the NPU_3 862-3 may be associated with a third machine learning model.

In some examples, the NPUs 862-1 to 862-n may be defined as a plurality of processing regions associated with a plurality of layers included in the machine learning model. For example, if the machine learning model is implemented in the form of an artificial neural network having a plurality of layers, the NPU_1 862-1 may perform computation on a processing region related to the first layer of the artificial neural network, and the NPU_2 862-2 may perform computation on a processing region related to the second layer of the artificial neural network. As another example, a plurality of NPUs may be associated with one layer. For example, the NPU_1 862-1 and the NPU_2 862-2 may perform computation on a processing region related to the first layer of the artificial neural network. As another example, one NPU may be associated with a plurality of layers.

Each of the plurality of NPUs 862-1 to 862-n included in the NPU cluster 860 may be supplied with clock signals from the first resource 810 and voltages from the second resource 820. Each of the plurality of NPUs 862-1 to 862-n included in the NPU cluster 860 may be supplied with voltages of intensities different from or same as each other and/or clock signals of the same speed as each other. As a faster clock signal is supplied, the NPUs 862-1 to 862-n may have faster computational speeds. Additionally or alternatively, the computational speed of the NPUs 862-1 to 862-n may increase as the voltage of higher intensity is supplied. In addition, although not illustrated, the memory may be supplied with the clock signals from the first resource 810 and the voltages from the second resource 820.

A certain number of NPUs may share one memory (not illustrated), and the memory may be shared by a certain number of NPUs. At this time, parameters for the computation of the machine learning model may be loaded into the memory. For example, a first parameter related to an output result of a first layer of an artificial neural network computed by the NPU_1 862-1 may be stored in the memory, and the computation of the second layer may be performed by the NPU_2 862-2 based on the first parameter stored in the memory, and a second parameter related to the computation result may be stored in the memory.

According to another example, the clock sources 812-1 to 812-n and/or the voltage sources 822-1 to 822-n may be divided to correspond to each processing region. That is, one or more clock sources and/or one or more voltage sources corresponding to the first processing region may be pre-allocated, and one or more clock sources and/or one or more voltage sources corresponding to the second processing region may be pre-assigned.

The processor 840 may control supply of resources to dynamically adjust the hardware performance. In addition, the processor 840 may determine at least one of the NPUs 862-1 to 862-n included in the NPU cluster 860 as a target NPU and determine a workload to be allocated to the target NPU. For this control, the processor 840 may include a scheduler 842 and a resource control unit 844.

The scheduler 842 may receive, from the FPGA 880, the traffic of market data for one or more target items and dynamically determine the allowed time based on the received traffic of market data. The traffic of market data may be measured based on the size of the market data received by the FPGA 880 or the frequency of market data reception per unit of time. In addition, the allowed time may be time allowed until order data is generated or time allowed until inference result is acquired from the machine learning model. The scheduler 842 may set the allowed time relatively short if the traffic of market data increases, and set the allowed time relatively long if the traffic of market data decreases. That is, the allowed time may be inversely proportional to the market traffic.

The scheduler 842 may determine the workload assigned to each NPU 862-1 to 862-N. The scheduler 842 may determine a target NPU to perform a task based on time allowed until the task is completed and the available resources of the hardware, and determine a workload for the inference computation of the machine learning model to be performed through the target NPU. The scheduler 842 may select at least one input data item from among a plurality of input data items based on the determined workload, and provide information associated with the selected at least one input data item to the target NPU. For example, the scheduler 842 may transfer an index for each of the selected at least one input data item to the target NPU, and the target NPU may extract at least one input data item from the memory based on the index. In this case, the index may be identification information associated with the priority of the input data stored in the memory queue. As another example, the scheduler 842 may extract at least one selected input data item from the memory and transmit the extracted at least one input data item to the target NPU. Accordingly, the target NPU may apply at least one input data item that is selected based on the workload to the machine learning model to perform the inference computation through the machine learning model. Various methods of assigning workloads by the scheduler 842 will be described below with reference to FIGS. 12 and 13.

The resource control unit 844 may control the resources supplied to the hardware to dynamically adjust the hardware performance. The resource control unit 844 may control so that one or more of the clock sources 812-1 to 812-$n$ included in the first resource 810 are activated, and may control so that one or more of the voltage sources 822-1 to 822-$n$ included in the second resource 820 are activated. The one or more activated clock sources may supply clock signals of a target speed to the hardware, and the one or more activated voltage sources may supply target voltages to the hardware. In the present disclosure, the number of clock sources, the number of voltage sources, and the number of NPU clusters are all represented by n, but each n may be different from each other or at least partially the same as each other.

The resource control unit 844 may determine whether or not to change the processing performance for the hardware based on the context information, and adjust the resources supplied to the hardware based on the determined result. According to another example, the resource control unit 844 may monitor the load of each of a plurality of NPUs 862-1 to 862-$n$ included in the NPU cluster 860, and when identifying an NPU with load exceeding a threshold, control the first resource 810 and/or the second resource 820 so that more resources are supplied to the identified NPU.

Meanwhile, if the sources are pre-allocated for each processing region, the resource control unit 844 may identify a processing region to change performance, and adjust the voltage intensity and/or the clock speed supplied to one or more NPUs performing computations on the identified processing region. At this time, the resource control unit 844 may activate one or more of the one or more voltage sources and/or the one or more clock sources associated with the identified processing region, or deactivate the already activated voltage sources and/or clock sources.

According to some examples, the resource control unit 844 may determine the resources of the hardware to process the workload based on the allowed time and the available resources of the hardware, and supply the determined resources to the hardware. At this time, the resource control unit 844 may supply the determined resources to the target NPU to which the workload is assigned.

FIG. 9 is a diagram illustrating various reference tables 910 and 920 used for hardware resource control. As illustrated in FIG. 9, a plurality of reference tables 910 and 920 may be stored in the memory of the information processing system. The resources recorded in the table in FIG. 9 may be associated with clock frequencies and voltages. For example, a first resource RES_#1 may include a first clock frequency and a first voltage, a second resource RES_#2 may include the first clock frequency and a second voltage, and a third resource RES_#3 may include a second clock frequency and the first voltage. In this case, the frequency may be associated with a frequency supplied from a clock source, and the voltage may be associated with a voltage supplied from a voltage source.

The first reference table 910 may include data mapped with consumed power, batch size, and resources. The consumed power recorded in the first reference table 910 may increase in proportion to the batch size and the resources. That is, the consumed power may increase as the batch size increases, as the clock frequency increases, and/or as the voltage increases. In this example, the consumed power may be understood as necessary power required for a workload to be described below.

A second reference table 920 may include data mapped with inference time, batch size, and resources. In this case, the inference time may be understood as a latency occurring during processing of a workload to be described below. The inference time included in the second reference table 920 may be inversely proportional to the batch size and/or proportional to the amount of resources. That is, the smaller the batch size, the shorter the inference time, and the larger the amount of resources, the shorter the inference time.

At least one table illustrated in FIG. 9 may be used when allocating workloads to NPUs, and may also be used when adjusting resources supplied to the hardware.

Figure 10:
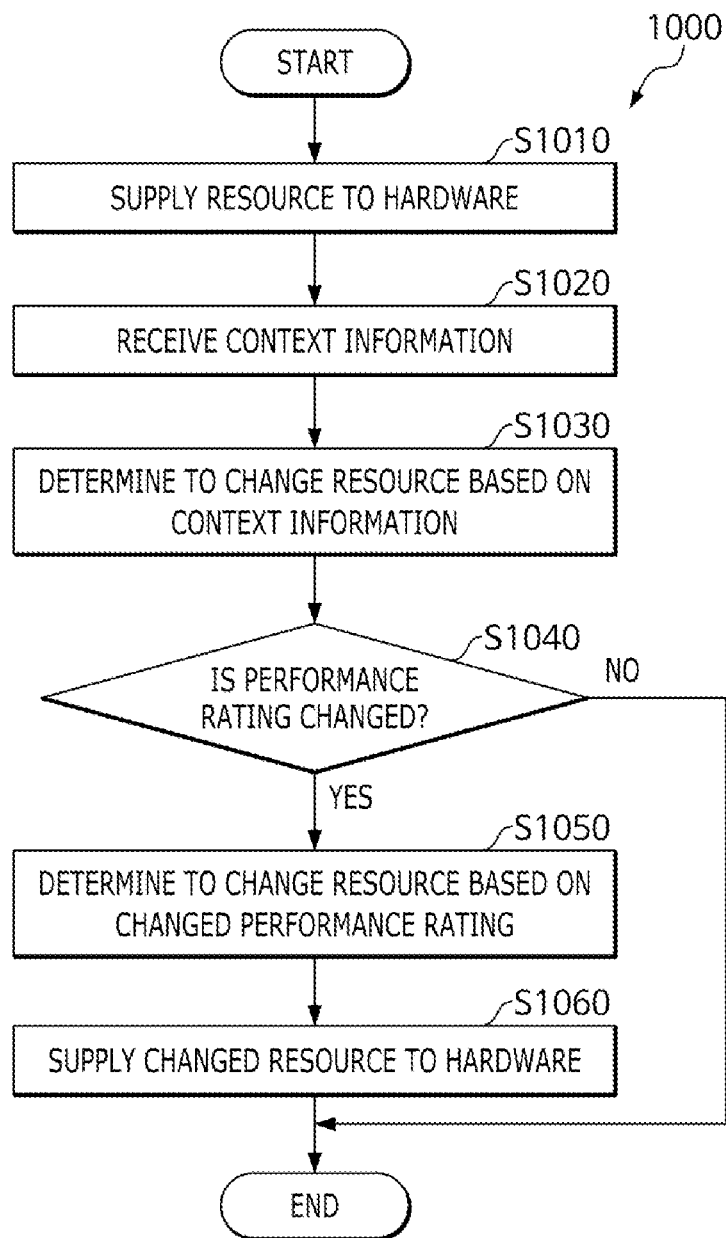
FIG. 10 is a flowchart illustrating a method for dynamically adjusting a hardware performance for high frequency trading.

FIG. 10 is a flowchart illustrating a method 1000 for dynamically adjusting a hardware performance for high frequency trading. The method illustrated in FIG. 10 is merely one example for achieving the object of the present disclosure, and it goes without saying that certain steps may be added or deleted as needed. In addition, the method illustrated in FIG. 10 may be performed by one or more processors included in the information processing system. For convenience of description, it will be described that each step of operation illustrated in FIG. 10 is performed by the processor included in the information processing system illustrated in FIG. 8.

The resources may be supplied to the hardware of the information processing system under the control of the processor, at S1010. In this case, the hardware may include at least one of the memory, the FPGA, the input traffic monitoring module, the dedicated accelerator for machine learning, or the central processing unit included in the information processing system. In addition, the resource may include at least one of voltage or clock signal.

The processor may receive context information, at S1020. The context information may include at least one of traffic of market data for one or more target items or computational complexity of using a machine learning model performed based on the market data. The traffic of market data may be identified based on at least one of a frequency of market data reception per unit of time or a volume of market data received per unit of time, and the processor may receive the traffic of market data identified as described above. For example, the volume of market data received per unit of time or the frequency of market data reception per unit of time may be measured by the processor (e.g., FPGA, and the like) performing data pre-processing and post-processing so that the traffic of market data is identified, and the processor may receive the traffic of market data from the processor performing the data pre-processing and post-processing.

The computational complexity may be measured based on at least one of a load on hardware or size of parameters used for computation of the machine learning model, and the processor may receive the computational complexity measured as described above. In this case, the load on hardware may be measured based on a usage rate of the hardware. In addition, the size of parameters may be measured based on the size of the parameters loaded into the memory during the computation process of the machine learning model. The computational complexity may increase as the size of the parameter increases, and the computational complexity may increase as the load on hardware increases. The computational complexity may be measured by the processor (e.g., FPGA) performing data pre-processing and post-processing and transmitted to the processor, or may be measured by the dedicated accelerator and transmitted to the processor. In some examples, the processor may directly measure the computational complexity of the machine learning model or the traffic of market data.

The processor may determine a performance rating required by the hardware based on the received context information, at S1030. The performance rating may be predefined as a plurality of ratings, and different ratings may be defined for each range of computational complexity and/or range of traffic of market data in advance. If both the computational complexity and the market traffic are used, different weights may be applied to the computational complexity and the market traffic, respectively, and different ratings may be predefined for each range according to the result of summing the weighted computational complexity and the market traffic. In addition, the amount of resources (e.g., target voltage and/or target speed) supplied according to each performance rating may be predefined.

The processor may determine whether or not the determined performance rating is changed from the previously determined performance rating, at S1040. That is, the processor may determine whether the currently determined performance rating is different from or equal to a previously determined performance rating.

In response to determining that the performance rating is not changed, the processor may determine that the resources supplied to the hardware are not changed. Accordingly, the resources supplied to the hardware are not changed, and the voltage with the same intensity as before and/or the clock signal of the same speed as before may be supplied to the hardware.

In response to determining that the performance rating is changed, the processor may determine that the resources supplied to the hardware is changed based on the changed performance rating, at S1050. The processor may identify an amount of resources corresponding to the determined performance rating (that is, to the changed performance rating). In this case, the amount of resources may be a target voltage and/or a target clock speed.

The processor may control so that one or more voltage sources and/or one or more clock sources are activated to supply resources corresponding to the identified amount of resources to the hardware, at S1060. According to the identified amount of resources, the amount of resources supplied to the hardware may be decreased or increased. For example, if the changed performance rating is higher than the previous performance rating, more resources are supplied to the hardware, improving the processing speed of the hardware. In this case, the processor may control so that a voltage source having a higher voltage than the immediately previously activated voltage source is activated, and/or control so that a clock source having a higher speed than the immediately previously activated clock source is activated. At this time, the processor may deactivate the immediately previously activated clock source and/or voltage source.

As another example, if the changed performance rating is lower than the previous performance rating, fewer resources may be supplied to the hardware, reducing the processing speed of the hardware. In this case, the processor may control so that a voltage source having a lower voltage than the immediately previously activated voltage source is activated, and/or control so that a clock source having a slower speed than the immediately previously activated clock source is activated. At this time, the processor may deactivate the immediately previously activated clock source and/or voltage source.

The process according to FIG. 10 corresponds to one cycle of receiving the context information, and may be repeatedly executed each time new context information is received. If the performance rating required for the hardware is not changed, resources supplied in the previous cycle may be continuously supplied to the hardware without a change.

Meanwhile, the processor may determine a performance rating higher than a threshold at which the hardware can exhibit maximum performance. If resources equal to or higher than the threshold value are supplied to the hardware according to the determination of the performance rating equal to or higher than the threshold value, the operating time of the hardware according to the supply of the resources equal to or higher than the threshold value may be limited. In other words, if the hardware is operated with a performance equal to or higher than the threshold value, the hardware may be physically damaged and its lifespan may be reduced. For example, the processor may be temporarily operated by overclocking, but the processor may be physically damaged if continuously operated beyond a certain time. In order to prevent this situation, the processor may measure a time at which resources equal to or greater than the threshold value is supplied, and if the measured time reaches the threshold time, control the resources such that resources lower than the threshold value are supplied to the hardware. For example, the processor may control so that the performance rating of the hardware is changed from the maximum performance rating to a performance rating lower by one level, and resources lower than the threshold value are supplied to the hardware based on the changed performance rating.

Hereinafter, a method of scheduling a task and/or a method of adjusting resources for high frequency trading will be described with reference to FIGS. 11 to 14. The method illustrated in FIGS. 11 to 14 is merely one example of achieving the object of the present disclosure, and it goes without saying that some steps may be added or deleted as necessary. In addition, the method illustrated in FIGS. 11 to 14 may be performed by one or more processors included in the information processing system. For example, the methods illustrated in FIGS. 11 to 14 may be performed by the scheduler 842 and/or the resource control unit 844 included in the processor 840 of FIG. 8. For convenience of explanation, it will be described that each step of operation shown in FIGS. 11 to 14 is performed by the processor 840 included in the information processing system 800 of FIG. 8.

Figure 11:
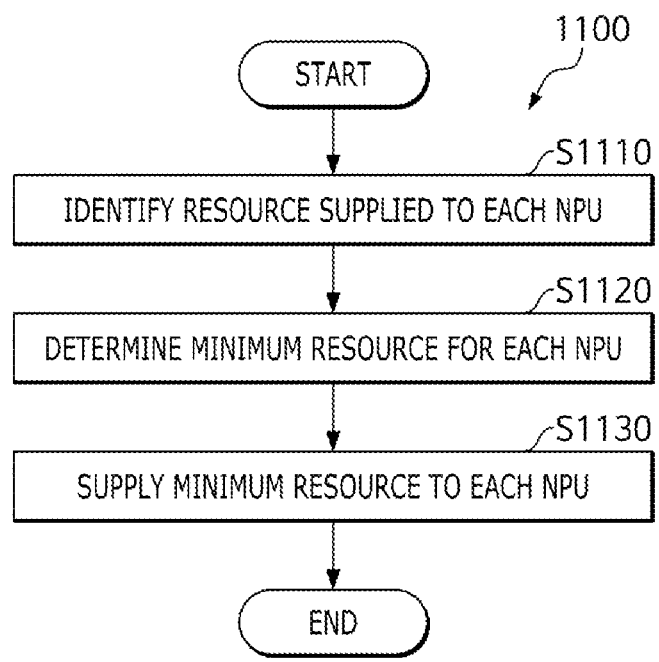
FIG. 11 is a flowchart illustrating a method of supplying minimum resources to hardware.

FIG. 11 is a flowchart illustrating a method 1100 for supplying minimum resources to the hardware. The method illustrated in FIG. 11 may be performed by the resource control unit 844 included in the processor 840 of FIG. 8. In addition, the method 1100 associated with FIG. 11 may be performed before the task scheduling is initiated. For example, if a preparation trigger or preparation command associated with task scheduling occurs, the process according to FIG. 11 may be performed.

The processor may identify the resources currently supplied to each of one or more NPUs, at S1110. In this case, the NPU may be an example of the dedicated accelerator for the machine learning model. In addition, the resource may include at least one of a voltage or a clock signal, and the processor may identify a resource that includes at least one of a voltage intensity or a clock frequency supplied to each NPU.

The processor may determine a minimum resource that can be supplied to each of one or more NPUs, S1120. The processor may identify a batch size of at least one input data item input to each NPU, select a plurality of candidate resources supplied to each NPU, and register the resources in a candidate resource list. In this case, a plurality of candidate resources may be selected from a range, in which the range may be less than the resources currently supplied to the NPU and greater than a predetermined lower limit. For example, if the resource supplied to NPU_1 is RES_#1, the plurality of candidate resources for NPU_1 may be less than RES_#1 and more than the lower limit. In addition, lists of candidate resources for each of one or more NPUs may be different from or same as each other. For example, if the same resource is currently supplied to NPU_1 and NPU_2, a first candidate resource list for NPU_1 may be the same as a second candidate resource list for NPU_2. As another example, if different resources are currently supplied to NPU_1 and NPU_3, the first candidate resource list for NPU_1 may be different from a third candidate resource list for NPU_3.

The processor may calculate a latency of task for each of the plurality of candidate resources, based on a batch size of input data input to each of the plurality of NPUs and candidate resources included in the candidate resource list for each of the NPUs. In this case, the latency of task may be the inference time of the machine learning model, and may be calculated using the second reference table 920 of FIG. 9. For example, if the batch size is BZ_#1 and the resource is RES_#1, the processor may calculate that the latency of task is INT_#1, by referring to the second reference table 920 of FIG. 9.

The processor may identify a candidate resource having the smallest resource among at least one candidate resource with the calculated latency of task being less than the allowed time for each NPU, and determine the identified candidate resource for each NPU as the minimum resource supplied to each NPU. Meanwhile, the resource may include voltage and clock frequency, and in this case, a first weight may be applied to the voltage and a second weight may be applied to the clock frequency, and a candidate resource having the smallest weighted sum may be determined to be the minimum resource.

The processor may adjust the resources such that the determined minimum resource for each NPU is supplied to each NPU, at S1130. The processor may control the first resource 810 and/or the second resource 820 illustrated in FIG. 8 so as to supply clock and/or voltage corresponding to the minimum resource to the NPU.

Figure 12:
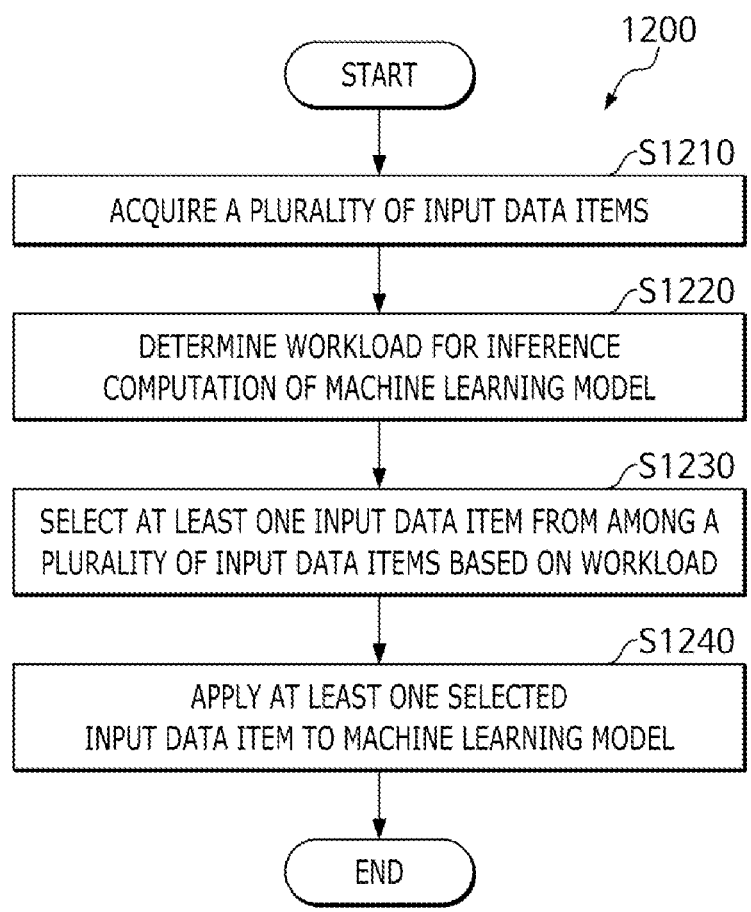
FIG. 12 is a flowchart illustrating a method of scheduling a task for high frequency trading.

FIG. 12 is a flowchart illustrating a method 1200 of scheduling a task for high frequency trading. Each method illustrated in FIG. 12 may be performed by the scheduler 842 included in the processor 840 of the information processing system 800 of FIG. 8.

The processor may acquire a plurality of input data items for high frequency trading, at S1210. The plurality of input data may be data obtained by pre-processing the market data.

The processor may determine a workload for the inference computation of the machine learning model based on the time allowed until the task is completed and the available resources of the hardware, at S1220. In this example, the allowed time may be dynamically determined as the time allowed until the order data is generated. The processor may acquire traffic of market data for one or more target items, and determine the time allowed until the task is completed based on the acquired traffic. The size of the workload may be determined based on an available length of time and an available amount of resources. A method for determining the workload based on the allowed time and the available resources of the hardware will be described in detail with reference to FIG. 11.

The processor may determine resources of the hardware for processing the workload and supply the determined resources to the hardware. In this case, the hardware may include at least one NPU, memory, FPGA, and the like. The processor may adjust at least one of a frequency or a voltage of a clock supplied to the hardware based on the determined resource. The hardware may include a plurality of NPUs, and the processor may allocate the determined workload to at least one of the plurality of NPUs. In this case, the processor may identify at least one NPU to which the workload is allocated, and adjust at least one of a clock speed or voltage supplied to the identified at least one NPU based on the determined resource.

The processor may select at least one input data item from among a plurality of input data items based on the determined workload, at S1230.

The processor may apply the selected at least one input data item to the machine learning model, at S1240. The hardware may include a plurality of NPUs for the computation of the machine learning model. In this case, the processor may determine a target NPU to handle the workload and provide the selected at least one input data item to the target NPU. The target NPU may input at least one selected input data item to the machine learning model to perform inference computations for high frequency trading.

Figure 13:
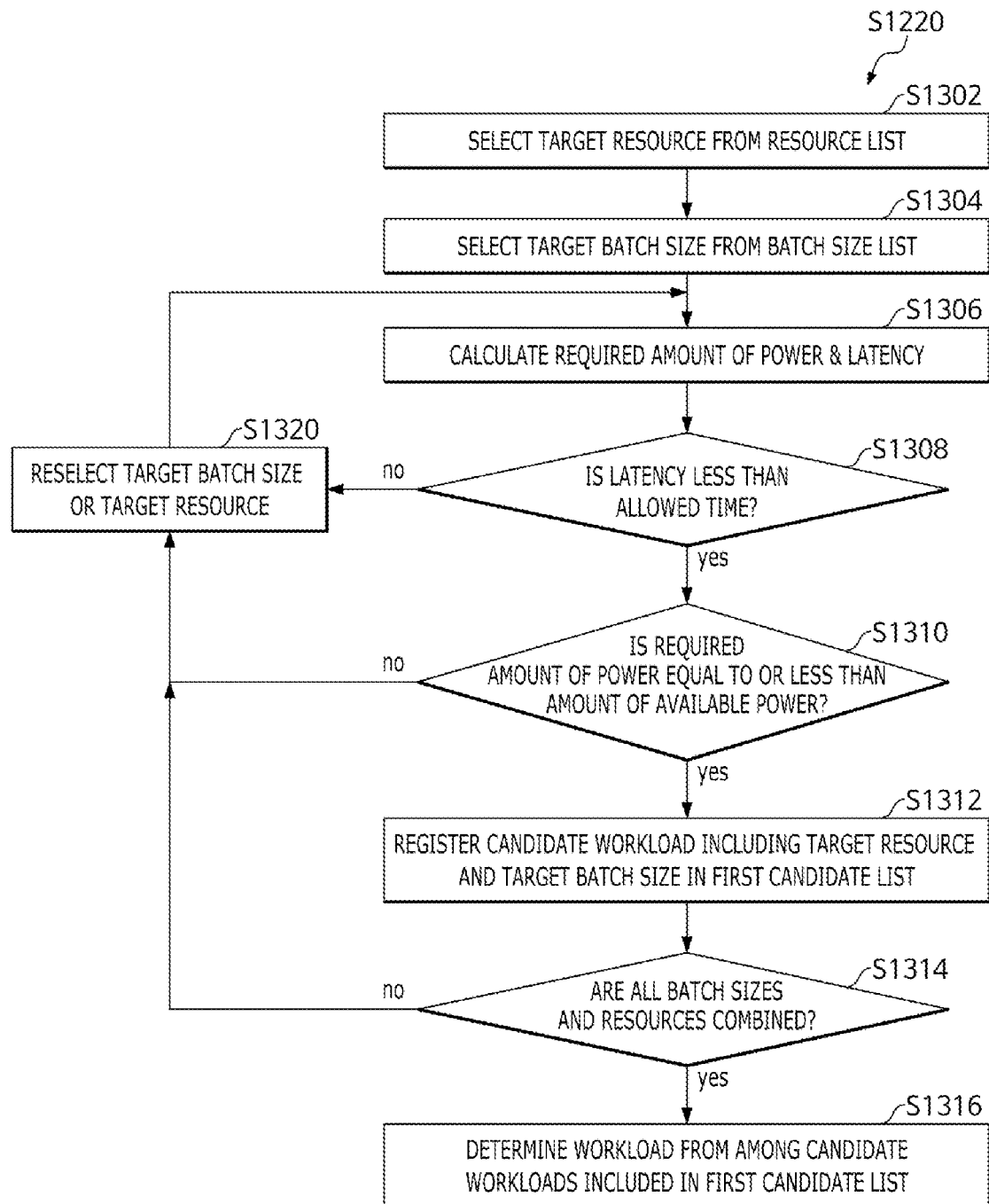
FIG. 13 is a flowchart provided to explain operation at S1220 of FIG. 12 in more detail.

FIG. 13 is a flowchart provided to explain operation at S1220 of FIG. 12 in more detail. The processor may select a target resource for verification from the resource list, S1302. In this case, the target resource may be a candidate resource allocated to the NPU. The resource list including a plurality of resources different from each other may be generated in advance. The resources may include voltages and/or clock frequencies, and a plurality of resources included in the resource list may include voltages and/or clock frequencies different from each other.

The processor may select a target batch size for verification from the batch size list, at S1304. In this case, the target batch size may be a candidate batch size allocated to the NPU. The batch size list including a plurality of batch sizes different from each other may be generated in advance. The resource list and the batch size list may be generated by an administrator and stored in the information processing system, and also updated by the administrator. As will be described below, the candidate workloads including resources and batch sizes that passed verification may be registered in the first candidate task list.

The processor may calculate a required amount of power and latency based on the target resource and the target batch size, at S1306. The processor may calculate the required amount of power using the first table 910 of FIG. 9 and calculate the latency using the second table 920 of FIG. 9. For example, the processor may acquire the required amount of power corresponding to the target resource and the target batch size from the first table 910 of FIG. 9, and acquire a latency corresponding to the target resource and the target batch size from the second table 920 of FIG. 9. In the first table 910 of FIG. 9, the required amount of power is illustrated as the consumed power, and in the second table 920 of FIG. 9, the latency is illustrated as an inference time of the machine learning model.

The processor may determine whether or not the calculated latency is less than the allowed time, at S1308. In response to determining that the latency is equal to or greater than the allowed time, the processor may reselect a target batch size from the batch size list or reselect a target resource from the resource list, at S1320. That is, the processor may determine that the verification of the combination of the target batch size and the target resource fails, and reselect the target batch size from the batch size list, or reselect the target resource from the resource list, such that a new combination of target batch size and target resource is generated. If the target batch size is reselected or the target resource is reselected, the processes from step S1306 may proceed again.

On the other hand, if the latency is less than the allowed time as the determination result in step S1308, the processor may determine whether the calculated amount of required power is equal to or less than the amount of available power, at S1310. In this case, the amount of available power may be measured by subtracting the amount of currently supplied power (that is, the amount of power already used) from the total amount of power. In response to the determination that the amount of power required exceeds the amount of available power, the processor may reselect a target batch size from the batch size list or reselect a target resource from the resource list, at S1320. That is, the processor may determine that the verification of the combination of the target batch size and the target resource fails, and reselect the target batch size from the batch size list, or reselect the target resource from the resource list, such that a new combination of target batch size and target resource is generated.

On the other hand, if the required amount of power is equal to or less than the amount of available power as the determination result in step S1310, the processor may generate a candidate workload including the target resource and the target batch size, and register the generated candidate workload in the first candidate list, at S1312. That is, a candidate workload having the successfully verified combination of a target resource and a target batch size may be registered in the first candidate list.

The processor may determine whether or not the resources included in the resource list and the resources included in the batch size list are all combined and verified according to the number of cases, at S1314. That is, based on the number of resources included in the resource list and the number of batch sizes included in the batch size list, the processor may determine whether or not the verification process is completely performed by a number of times corresponding to the number of combinations. For example, if three resources are registered in the resource list and three batch sizes are registered in the batch size list, the processor may determine whether or not the verification process for each of the nine combinations of the target resources and the target batch sizes is performed.

In response to the determination that not all the number of cases of the combination of the resources included in the resource list and the resources included in the batch size list are verified, the processor may select the target resource or the target batch size again such that the resources and batch size, which are not yet combined, are combined, at S1320. The processes from the operation at S1306 may be performed based on the newly combined target resource and target batch size.

According to the process described above, the combination of the resource and the batch size that passed verification may be registered in the first candidate list. As the verification is performed, the latency of each of the candidate workloads registered in the first candidate list may be within the allowed time, and the required amount of power of each of the candidate workloads registered in the first candidate list may be within the amount of available power.

Meanwhile, in response to the determination that the resources included in the resource list and the resources included in the batch size list are all combined according to the number of cases, the processor may determine a workload for the inference computation of the machine learning model from among candidate workloads included in the first candidate list, at S1316. The target resource included in the determined workload may be a resource allocated to hardware (e.g., NPU) for inference computation. The processor may supply the resources to the NPU for handling the workload based on the target resources (allocated resources) included in the determined workload. Accordingly, the NPU performing the inference computation of the machine learning model may be supplied with as much resources as the target resource.

The processor may determine the workload for the inference computation of the machine learning model based on at least one of a performance index, a resource size, a latency, or a batch size. As an example of the performance index, Performance Per Watt (PPW) may be used. The present disclosure is not limited thereto, and various indexes other than PPW may be used as a performance index.

If the PPW is used as the performance index, the processor may calculate the PPW based on the batch size, latency, and required amount of power. Equation 1 below may be used to calculate PPW.

$$PPW = \frac{\text{batch\_size}}{\text{latency} * \text{consumed\_power}} \qquad \langle \text{Equation 1} \rangle$$

where, "PPW" is an example of the performance index, and "latency" may indicate the latency, "consumed_power" may indicate the required amount of power, and "batch size" may indicate the batch size.

The processor may calculate the latency and the required amount of power based on the batch size and the resources included in the candidate workload. At this time, the processor may calculate the required amount of power using the first reference table 910 of FIG. 9 and calculate the latency using the second reference table 920 of FIG. 9. In addition, the processor may calculate the PPW of the candidate workload as a performance index by substituting the calculated required amount of power, latency, and batch size into Equation 1.

If the performance index of each candidate workload included in the first candidate list is calculated, the processor may determine the candidate workload having the highest performance index as a workload for the inference computation of the machine learning model.

As another example, the processor may determine a candidate workload having the least target resources as a workload for an inference computation of the machine learning model, based on target resources included in each of the one or more candidate workloads registered in the first candidate list. That is, the processor may determine a candidate workload requiring the least resources as a workload for the inference computation of the machine learning model.

As another example, the processor may calculate latency of each of one or more candidate workloads based on the allocated resources and the batch sizes related to each of the one or more candidate workloads registered in the first candidate list, and determine a candidate workload having the shortest calculated latency as a workload for the inference computation. That is, the processor may determine a candidate workload that can be inferred most quickly as a workload for the inference computation.

As another example, the processor may determine a candidate workload having the largest batch size as a workload for the inference computation based on batch sizes related to each of the one or more candidate workloads registered in the first candidate list. That is, the processor may determine a candidate workload capable of processing input data corresponding to the largest batch size as the workload for the inference computation.

Meanwhile, the target resource and batch size may not be registered in the first candidate list. That is, none of the combinations of the target resources and the batch sizes may pass the verification process, in which case no candidate workload may be registered in the first candidate list. In this case, the processor may extract the oldest input data from among the plurality of input data and apply the extracted input data to a rule-based order model that generates order data based on rules. The input data applied in the rule-based ordering model may be deleted from the queue in memory.

In this case, the rule-based order model may be a model that automatically generates order data based on predefined rules without using a machine learning model. For example, the rule-based ordering model may be a model including rule information (e.g., formulas, modeling, and the like) in which input rules and output rules correspond to each other on a one-to-one basis. The rule-based ordering model may acquire input rules from the input data and generate the order data based on output rules corresponding to the input rules. In this case, the input rules may include items, ask price, comprehensive stock indexes, trading volume, and the like, and the output rules may include selling or buying, order volume, price, and the like. A plurality of pairs of input rules and output rules may be predefined by an administrator.

Meanwhile, remaining available resources may be additionally supplied to at least one of a plurality of NPUs performing an inference computation according to at least one input data item associated with the workload.

Figure 14:
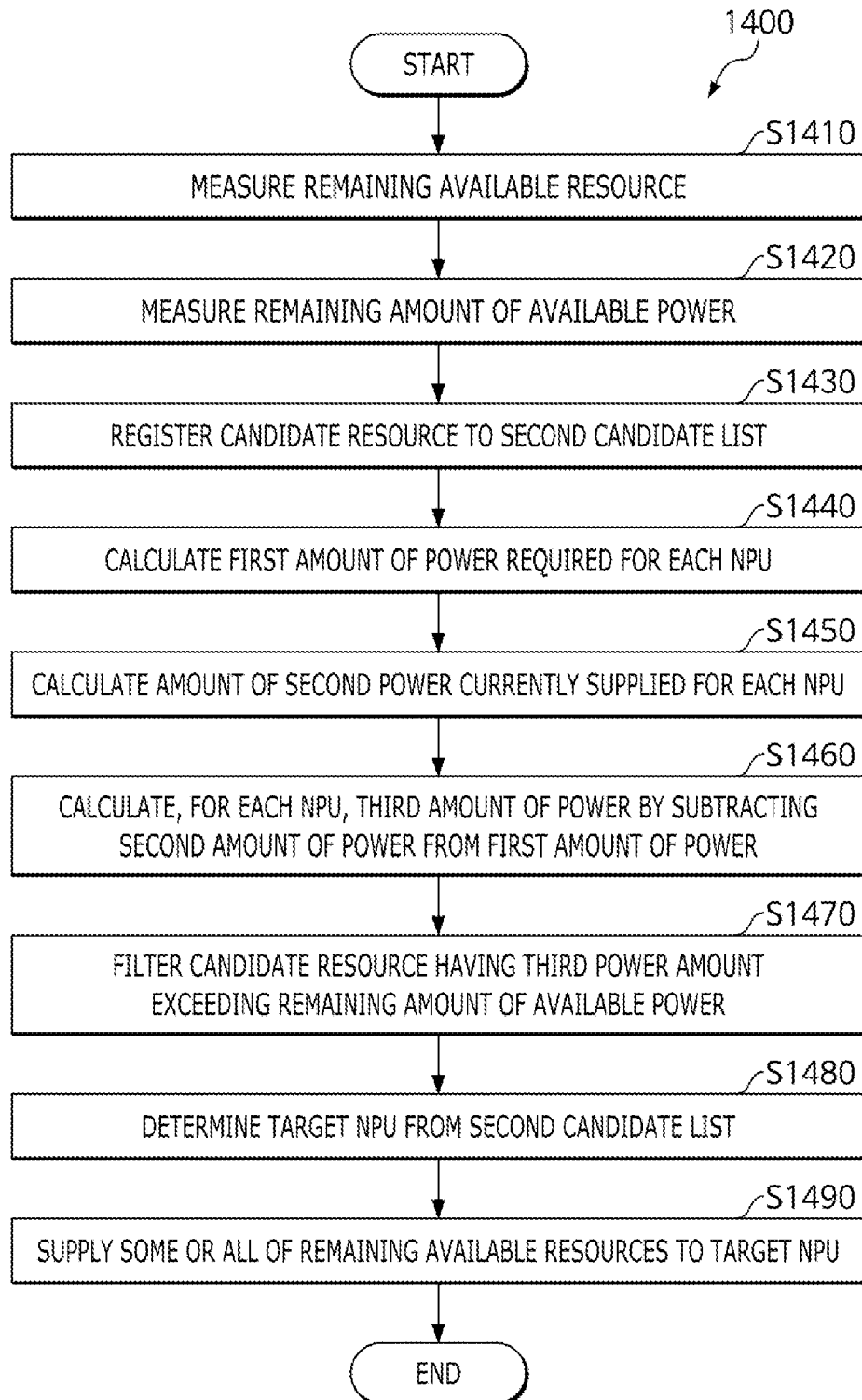
FIG. 14 is a flowchart illustrating a method of additionally supplying available resources to an NPU.

FIG. 14 is a flowchart illustrating a method 1400 of additionally supplying available resources to the NPU. Each method illustrated in FIG. 14 may be performed by the resource control unit 844 included in the processor 840 of the information processing system 800 of FIG. 8. In addition, the method 1400 according to FIG. 14 may proceed after the method 1200 according to FIG. 12.

The processor may measure the remaining available resources after the supply to at least one NPU, at S1410. In this case, the remaining available resources may include a voltage and/or a clock signal remaining after the supply to at least one NPU.

The processor may measure a remaining amount of available power after the supply to at least one NPU, at S1420. For example, the processor may measure the remaining amount of available power by subtracting the amount of currently supplied power from the maximum amount of power available for supply.

The processor may register candidate resources for each of the one or more NPUs in the second candidate list, at S1430. In this case, the processor may identify the NPU that is performing the inference computation, and register candidate resources for each of the identified at least one NPU in the second candidate list. In this case, the candidate resource may have resources increased than the resources supplied to the NPU. That is, since it is necessary to select the NPU to receive additional resource supply to process an inference computation more quickly, the candidate resources may have resources increased than the resources currently supplied to the NPU. In this case, the amount of increase in resources may be determined in advance.

the processor may identify at least one NPU registered in the second candidate list, and identify a batch size for the input data input to each NPU. In addition, the processor may calculate a first amount of power, which is the required amount of power, for each NPU based on the candidate resource for each NPU and the batch size for each NPU included in the second candidate list, at S1440. The processor may calculate the first amount of power using the first reference table 910 of FIG. 9.

The processor may calculate a second amount of power, which is the power currently supplied for each NPU, at S1450. For example, the processor may calculate the second amount of power using the first reference table 910 of FIG. 9. As another example, the processor may measure the amount of second power currently supplied to each NPU using a voltage sensor and/or a current sensor.

The processor may calculate a third amount of power, which is the power obtained by subtracting the second amount of power from the first amount of power for each NPU, at S1460. In this case, the third amount of power may be understood as an amount of additional power supply.

The processor may determine whether or not the third amount of power exceeds the remaining amount of available power and remove candidate resources having the third amount of power exceeding the remaining amount of available power from the second candidate list, thereby filtering the second candidate list, at S1470.

The processor may determine a target NPU to receive the remaining available resource supply, among the NPUs associated with at least one candidate resource included in the second candidate list, at S1480. The processor may determine one target NPU from the NPUs associated with at least one candidate resource included in the second candidate list, based on at least one of the performance index, the third amount of power, and the batch size.

For example, the processor may identify the batch size for at least one input data item input to each NPU registered in the second candidate list, and calculate additional performance indexes for each NPU based on the identified batch size for each NPU and candidate resources included in the second candidate list. At this time, the processor may calculate an additional performance index for each NPU using Equation 1. Specifically, the processor may calculate the latency and required amount of power, and apply the calculated latency and required amount of power to Equation 1 to calculate the current first performance index for each NPU based on the batch size and resources included in the pre-allocated workload for each NPU. In addition, the processor may calculate the latency and the required amount of power based on the identified batch size for each NPU and the candidate resource included in the second candidate list, and apply the calculated latency and required amount of power to Equation 1 to calculate, for each NPU, an expected second performance index if the remaining resources are supplied. The processor may calculate an additional performance index for each NPU by subtracting the first performance index from the second performance index. The processor may determine an NPU having the highest additional performance index as a target NPU to receive the remaining available resource supply.

As another example, the processor may calculate the amount of power to be additionally supplied to each of one or more NPUs registered in the second candidate list based on the candidate resources included in the second candidate list. The processor may calculate the amount of power to be added for each NPU by referring to the first reference table 910 of FIG. 9. Specifically, the processor may calculate a fourth amount of power based on the batch size and resources included in pre-allocated workloads for each NPU. In this case, the fourth amount of power may be the amount of power currently supplied to the NPU. In addition, the processor may calculate a fifth amount of power for each NPU based on the identified batch size for each NPU and the candidate resource included in the second candidate list. In this case, the fifth amount of power may be the amount of power that is required when supplying the candidate resource. The processor may calculate an additional amount of power for each NPU by subtracting the fourth amount of power from the fifth amount of power. The processor may determine an NPU having the smallest amount of additional power as a target NPU to receive the remaining available resource supply.

As another example, the processor may identify the batch size for at least one input data item input to each of the NPUs registered in the second candidate list, and determine an NPU having the largest batch size among the identified batch sizes as a target NPU to receive the remaining available resource supply.

In response to determining the target NPU, the processor may supply some or all of the remaining available resources to the target NPU, at S1490. The processor may determine the amount of resources supplied to the target NPU based on the candidate resources associated with the target NPU, and supply the as much remaining available resources as the determined amount of resources to the target NPU. For example, the processor may control the first resource 810 and/or the second resource 820 of FIG. 8 to supply clock signals and/or voltages to the target NPU.

Figure 15:
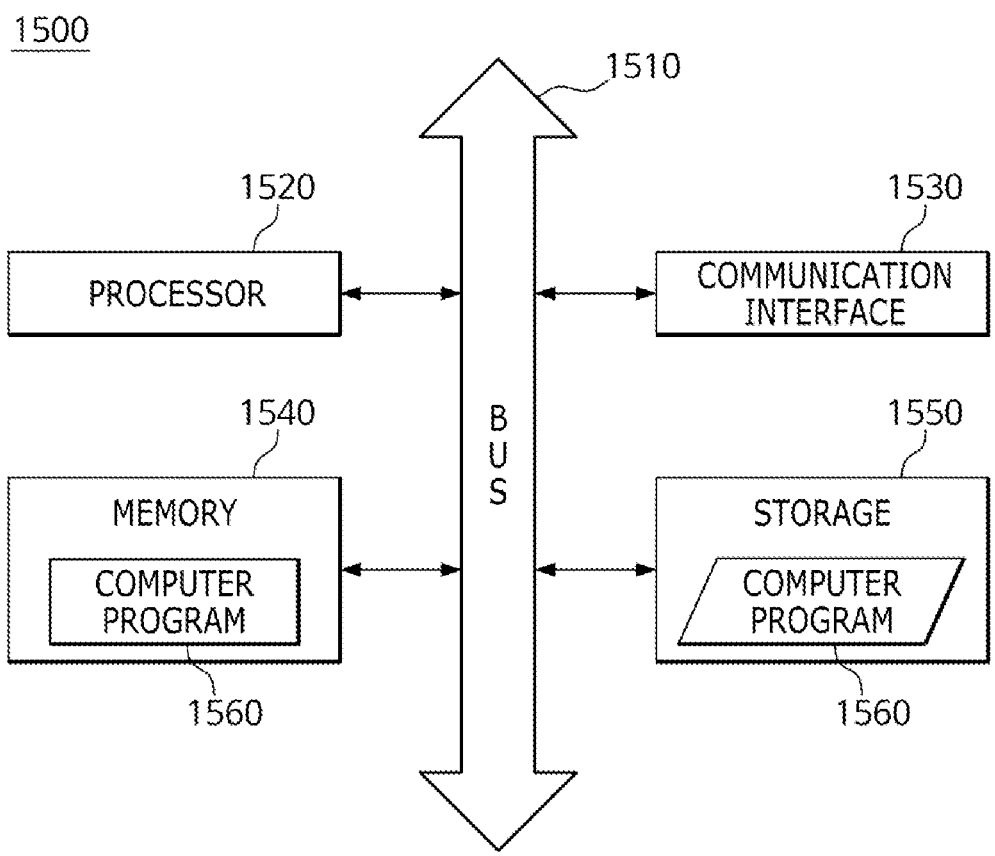
FIG. 15 illustrates a configuration of any computing device associated with the stock trade generation.

FIG. 15 illustrates a configuration of any computing device 1500 associated with the stock trade generation. For example, the computing device 1500 may include the information processing system 110 and/or a user terminal (not illustrated). As illustrated, the computing device 1500 may include one or more processors 1520, a bus 1510, a communication interface 1530, a memory 1540 for loading a computer program 1560 for execution by the processors 1520, and a storage 1550 for storing the computer program 1560. Meanwhile, only the components related to the present example are illustrated in FIG. 15. Accordingly, those of ordinary skill in the art to which the present disclosure pertains will be able to recognize that other general-purpose components may be further included in addition to the components illustrated in FIG. 15.

The processors 1520 control the overall operation of each component of the computing device 1500. The processor 1520 may include central processing unit (CPU), micro processor unit (MPU), micro controller unit (MCU), graphic processing unit (GPU), neural processing unit (NPU), or any type of processor well known in the technical field of the present disclosure. In addition, the processor 1520 may perform computation on at least one application or program for executing the method according to various examples. The computing device 1500 may include one or more processors. For example, the computing device 1500 may include a processor implemented in an FPGA, and a dedicated accelerator for a machine learning model implemented in an ASIC (NPU ASIC).

The memory 1540 may store various types of data, instructions, and/or information. The memory 1540 may load one or more computer programs 1560 from the storage 1550 so as to execute the method/operation according to various examples of the present disclosure. The memory 1540 may be implemented as a volatile memory such as RAM, but the technical scope of the present disclosure is not limited thereto.

The bus 1510 may provide a communication function between components of the computing device 1500. The bus 1510 may be implemented as various types of buses such as an address bus, a data bus, a control bus, or the like.

The communication interface 1530 may support wired/wireless Internet communication of the computing device 1500. In addition, the communication interface 1530 may support various other communication methods in addition to the Internet communication. To this end, the communication interface 1530 may include a communication module well known in the technical field of the present disclosure.

The storage 1550 may non-temporarily store one or more computer programs 1560. The storage 1550 may include a nonvolatile memory such as a read only memory (ROM), an erasable programmable ROM (EPROM), an electrically erasable programmable ROM (EEPROM), a flash memory, and the like, a hard disk, a detachable disk, or any type of computer-readable recording medium well known in the art to which the present disclosure pertains.

The computer program 1560 may include one or more instructions that, if loaded into the memory 1540, cause the processors 1520 to perform an operation/method in accordance with various embodiments of the present disclosure. That is, the processors 1520 may execute the one or more instructions so as to perform operations/methods according to various examples. For example, the processor 1520 may be configured to execute one or more instructions in the memory 1540 to receive context information including at least one of traffic of market data for one or more target items or computational complexity of using a machine learning model performed based on the market data, determine whether or not to change a processing performance for hardware based on the received context information, and change the resources supplied to the hardware based on the determination result for changing the processing performance. As another example, the processor 1520 may be configured to execute one or more instructions in the memory 1540 to acquire a plurality of input data items for high frequency trading, determine a workload for an inference computation of a machine learning model based on time allowed until the task is completed and available resources of the hardware, select at least one input data item from among the plurality of input data based on the determined workload, and apply the selected at least one input data item to the machine learning model.

The flowchart and description described above are merely examples, and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

If implemented in software, the techniques described above may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a web site, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A system for adjusting a hardware performance for high frequency trading comprising:
   a memory; and
   one or more processors connected to the memory and configured to execute one or more computer-readable programs included in the memory,
   wherein the one or more programs include instructions for:
   acquiring, by the one or more processors, a plurality of input data items for high frequency trading;
   determining, by the one or more processors, a workload for an inference computation of a machine learning model based on time allowed until a task is completed and available resources of the hardware, wherein the determining the workload includes determining one or more resources of the hardware for processing the workload;

supplying, by the one or more processors, the one or more determined resources to the hardware using one or more supply lines formed between the one or more determined resources and the hardware;

selecting, by the one or more processors, at least one input data item from among the plurality of input data based on the determined workload; and applying, by the one or more processors, the selected at least one input data item to the machine learning model.

2. The system according to claim 1, wherein the determining one or more resources of the hardware for processing the workload is based on the allowed time and the available resources of the hardware.

3. The system according to claim 1, wherein the supplying the one or more determined resources to the hardware includes adjusting at least one of a speed of a clock or a voltage supplied to the hardware based on the one or more determined resources.

4. The system according to claim 3, wherein the hardware includes a plurality of dedicated accelerators for computation of the machine learning model, and the adjusting at least one of the speed of the clock or the voltage includes:
identifying among the plurality of dedicated accelerators, at least one dedicated accelerator assigned with the workload; and
adjusting at least one of the speed of the clock or the voltage supplied to the identified at least one dedicated accelerator.

5. The system according to claim 1, wherein the determining the workload for the inference computation of the machine learning model includes:
registering one or more candidate workloads capable of completing a task within the allowed time in a candidate list; and
determining one candidate workload in the candidate list as the workload for the inference computation, and
at least one input data item having a batch size included in the determined workload is input to the machine learning model.

6. The system according to claim 5, wherein the determining one candidate workload in the candidate list as the workload for the inference computation includes:
calculating a performance index for each of the one or more candidate workloads based on allocated resources and a batch size related to each of the one or more candidate workloads; and
determining a candidate workload having the highest calculated performance index as a workload for the inference computation.

7. The system according to claim 5, wherein the determining one candidate workload in the candidate list as the workload for the inference computation includes:
calculating a latency of each of the one or more candidate workloads based on allocated resources and a batch size related to each of the one or more candidate workloads; and
determining a candidate workload having the shortest calculated latency as a workload for the inference computation.

8. The system according to claim 1, wherein the hardware includes a plurality of dedicated accelerators for computation of the machine learning model, and
resources are supplied to each of the plurality of dedicated accelerators, and wherein the one or more programs further include instructions for:
after the inputting the selected at least one input data item to the machine learning model:
measuring remaining available resources after the supply to each of the plurality of dedicated accelerators;
determining, from among the plurality of dedicated accelerators, a target dedicated accelerator to be provided with the measured remaining available resources; and
supplying some or all of the remaining available resources to the determined target dedicated accelerator.

9. The system according to claim 8, wherein the determining the target dedicated accelerator includes:
registering candidate resources for each of one or more dedicated accelerators in a candidate list, wherein the candidate resources have resources increased than the resources supplied to dedicated accelerators; and
determining a dedicated accelerator associated with one of one or more candidate resources registered in the candidate list as the target dedicated accelerator, and
the supplying some or all of the remaining available resources includes supplying some or all of the available resources to the target dedicated accelerator based on the one candidate resource associated with the target dedicated accelerator.

10. The system according to claim 9, wherein the registering the candidate resource in the candidate list includes:
measuring an amount of remaining power after the supply to each of the plurality of dedicated accelerators;
if a candidate resource is supplied to each of the one or more dedicated accelerators, calculating a first amount of power required for each of the one or more dedicated accelerators;
calculating, for each of the one or more dedicated accelerators, a third amount of power by subtracting a second amount of power currently supplied to each of the one or more dedicated accelerators from the calculated first amount of power;
identifying a dedicated accelerator having the calculated third amount of power exceeding the remaining amount of power; and
removing a candidate resource associated with the identified dedicated accelerator from the candidate list.

11. The system according to claim 9, wherein the determining the dedicated accelerator associated with the one candidate resource as the target dedicated accelerator includes:
calculating an additional performance index for each of the one or more dedicated accelerators based on a batch size of at least one input data item input to each of the one or more dedicated accelerators and a candidate resource included in the candidate list; and
determining a dedicated accelerator having the highest calculated additional performance index as the target dedicated accelerator.

12. The system according to claim 9, wherein the determining the dedicated accelerator associated with the one candidate resource as the target dedicated accelerator includes:
calculating an amount of power added to each of the one or more dedicated accelerators based on the candidate resources included in the candidate list; and
determining a dedicated accelerator having a minimum amount of power among the calculated amounts of power as the target dedicated accelerator.

* * * * *